(12) United States Patent
Sugawara

(10) Patent No.: US 9,362,545 B2
(45) Date of Patent: Jun. 7, 2016

(54) ELECTRICITY STORAGE DEVICE

(75) Inventor: Tatsuo Sugawara, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 349 days.

(21) Appl. No.: 14/001,104

(22) PCT Filed: May 18, 2011

(86) PCT No.: PCT/JP2011/061431
§ 371 (c)(1),
(2), (4) Date: Aug. 22, 2013

(87) PCT Pub. No.: WO2012/157094
PCT Pub. Date: Nov. 22, 2012

(65) Prior Publication Data
US 2013/0337299 A1    Dec. 19, 2013

(51) Int. Cl.
*H01M 10/48* (2006.01)
*H01M 2/34* (2006.01)
*H01M 2/20* (2006.01)
*H01M 10/0525* (2010.01)

(52) U.S. Cl.
CPC ............... *H01M 2/34* (2013.01); *H01M 2/206* (2013.01); *H01M 10/0525* (2013.01); *H01M 10/482* (2013.01); *H01M 2220/20* (2013.01); *Y02E 60/122* (2013.01); *Y02P 70/54* (2015.11)

(58) Field of Classification Search
CPC H01M 10/0525; H01M 10/482; H01M 2/206
See application file for complete search history.

(56) References Cited

U.S. PATENT DOCUMENTS

| 6,166,453 A * | 12/2000 | Kon'i | B60G 17/0185 307/10.1 |
| 2003/0096158 A1* | 5/2003 | Takano | H01M 10/482 429/90 |
| 2005/0077878 A1* | 4/2005 | Carrier | B25F 5/00 320/134 |
| 2005/0140334 A1* | 6/2005 | Tamai | H02J 7/0019 320/116 |
| 2009/0198399 A1* | 8/2009 | Kubo | B60L 11/1855 701/22 |
| 2010/0248008 A1* | 9/2010 | Sugawara | H01M 2/1077 429/159 |
| 2011/0244283 A1* | 10/2011 | Seto | H01M 2/1077 429/91 |

FOREIGN PATENT DOCUMENTS

| JP | 11-120986 A | 4/1999 |
| JP | 11-120987 A | 4/1999 |
| JP | 2000-123802 A | 4/2000 |
| JP | 2000-223160 A | 8/2000 |
| JP | 2008-226744 A | 9/2008 |
| JP | 2010-113999 A | 5/2010 |
| JP | 2010-238609 A | 10/2010 |
| JP | 2010-277795 A | 12/2010 |
| JP | 2011-216400 A | 10/2011 |

* cited by examiner

*Primary Examiner* — Stewart Fraser
*Assistant Examiner* — Olatunji Godo
(74) *Attorney, Agent, or Firm* — Volpe and Koenig, P.C.

(57) ABSTRACT

An electricity storage device comprises a plurality of electricity storage cells, a casing which stores the electricity storage cells, a plurality of conductive members for electrically connecting the electricity storage cells together, a control device which controls the electricity storage cells, and voltage detection lines for electrically connecting the electricity storage cells with the control device. The casing includes at least a pair of side plates made of resin.

11 Claims, 18 Drawing Sheets

ELECTRICITY STORAGE DEVICE

TECHNICAL FIELD

The present invention relates to an electricity storage device comprising a plurality of electricity storage cells.

BACKGROUND ART

There has been known a power supply device configured to store a plurality of battery modules (each including a plurality of batteries connected in series) in a battery case and to protect the battery modules by use of a protective electronic circuit installed in the battery case (see Patent Literature 1, for example). In the power supply device described in the Patent Literature 1, bus bars connecting the battery modules together are connected to the protective electronic circuit in order to detect the voltages of the battery modules. For the connection of the bus bars to the protective electronic circuit, each bus bar is connected to a fuse via a lead plate, and the fuse is connected to the protective electronic circuit via a lead wire.

PRIOR ART LITERATURE

Patent Literature

Patent Literature 1: JP-2000-223160-A

SUMMARY OF THE INVENTION

Problem to be Solved by the Invention

The power supply device disclosed in the Patent Literature 1 requires the work of forming grooves on a casing member of the power supply device and fitting the lead wires (for the detection of the voltages) in the grooves of the casing member. Thus, the device of the Patent Literature 1 involves a problem in that the complicated and troublesome work of wiring the lead wires is necessary.

Means for Solving the Problem

An electricity storage device in accordance with a first aspect of the present invention comprises: a plurality of electricity storage cells; a casing which stores the electricity storage cells; a plurality of conductive members for electrically connecting the electricity storage cells together; a control device which controls the electricity storage cells; and voltage detection lines for electrically connecting the electricity storage cells with the control device. The casing includes at least a pair of side plates made of resin.

In accordance with a second aspect of the present invention, in the electricity storage device according to the first aspect, the voltage detection lines are integrated with the side plates while being formed in prescribed shapes. The voltage detection lines have voltage detection conductor parts electrically connected to the electricity storage cells and voltage detection lead wire parts for electrically connecting the voltage detection conductor parts to the control device.

In accordance with a third aspect of the present invention, in the electricity storage device according to the first or second aspect, the voltage detection lines are provided with a current interrupting device for interrupting electric current from the electricity storage cells.

In accordance with a fourth aspect of the present invention, in the electricity storage device according to the third aspect, the current interrupting device is arranged in/on the side plate.

In accordance with a fifth aspect of the present invention, the electricity storage device according to the third or fourth aspect further comprises voltage detection conductor connector parts for connection between voltage detection lead wire connector parts attached to the voltage detection lead wire parts and end parts of the voltage detection conductor parts not connected to the electricity storage cells. The voltage detection conductor connector parts are arranged in/on the side plate.

In accordance with a sixth aspect of the present invention, in the electricity storage device according to the fifth aspect, the current interrupting device and the voltage detection conductor connector parts are formed integrally.

In accordance with a seventh aspect of the present invention, in the electricity storage device according to any one of the third through sixth aspects, resistance wires are used as current interrupting parts of the current interrupting device.

Effect of the Invention

According to the present invention, the connection between the control device and the electricity storage cells can be made with ease.

BRIEF DESCRIPTION OF THE DRAWINGS

FIG. 13(*b*) is a cross-sectional view taken along the line X-X in FIG. 13(*a*).

FIG. 17(b) is a cross-sectional view taken along the line A-A in FIG. 17(a).

FIG. 17(c) is a cross-sectional view taken along the line B-B in FIG. 17(a).

MODE FOR CARRYING OUT THE INVENTION

In the following, an electricity storage module and an electricity storage device in accordance with an embodiment of the present invention will be described in detail with reference to figures.

The following explanation will be given by taking an example of a case where an electricity storage module in accordance with an embodiment of the present invention is applied to an electric vehicle, specifically, to an electricity storage device constituting an in-vehicle power supply device of an electric vehicle. The electric vehicle can be a hybrid electric vehicle having an engine (internal combustion engine) and an electric motor as its driving sources, a pure electric vehicle having an electric motor as its only driving source, etc.

Figure 1:
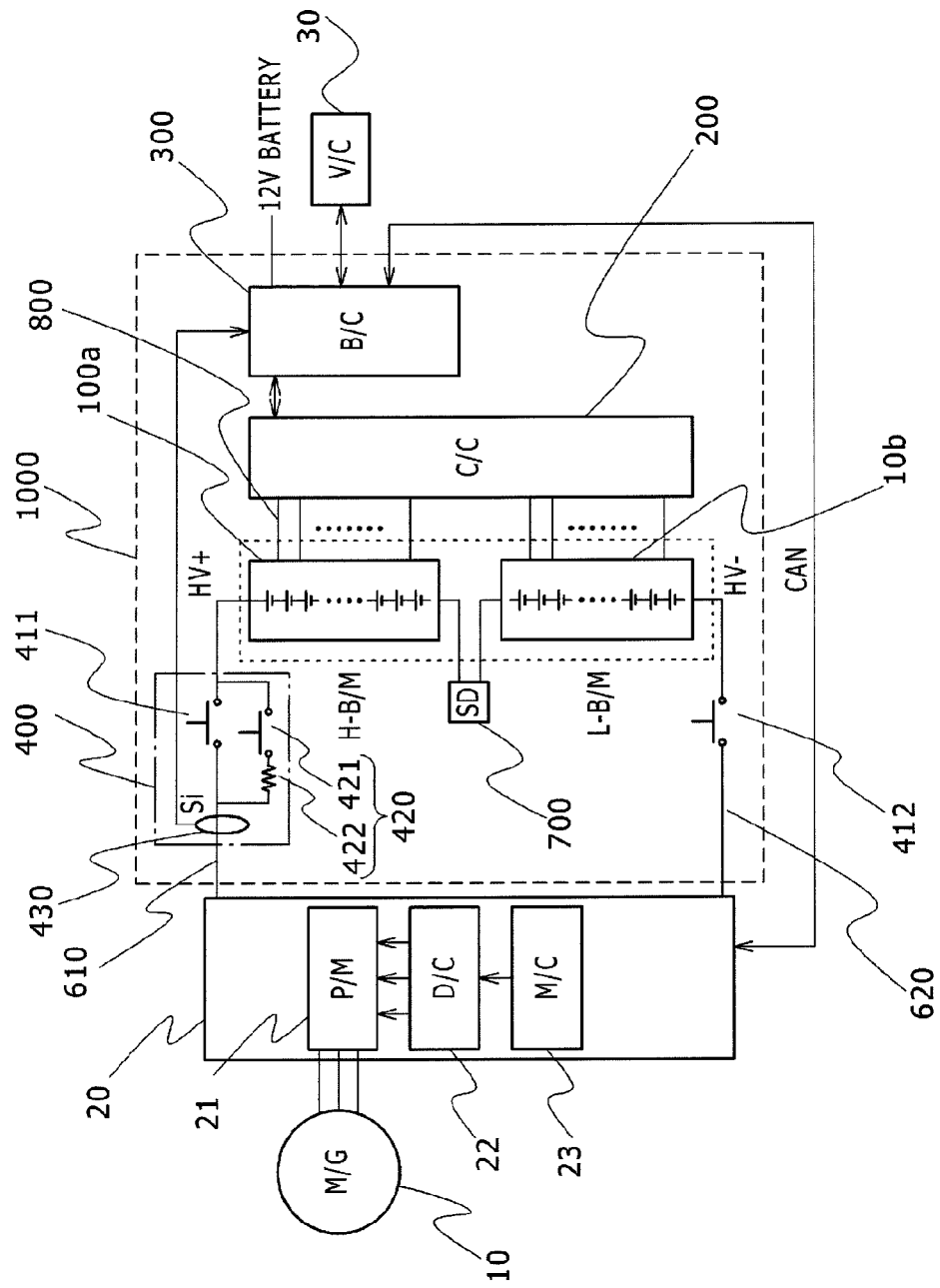
FIG. 1 is a block diagram showing the configuration of an in-vehicle electric machine system employing an electricity storage device in accordance with an embodiment of the present invention.

First, the configuration of an in-vehicle electric machine system (electric motor drive system) including the electricity storage module according to this embodiment will be described below referring to FIG. 1.

The in-vehicle electric machine system comprises a motor generator 10, an inverter device 20, a vehicle controller 30 for controlling the whole vehicle, an electricity storage device 1000 forming an in-vehicle power supply device, etc. The electricity storage device 1000, including a plurality of electricity storage cells (also called "electricity storage elements"), is configured as a lithium-ion battery device including a plurality of lithium-ion battery cells, for example.

The motor generator 10 is a three-phase AC (Alternating Current) synchronous machine. The motor generator 10 generates driving power as a motor and supplies the generated rotary power to driven parts such as the wheels and the engine in operation modes needing the rotary power (power running of the vehicle, startup of the engine (internal combustion engine), etc.). In this case, the in-vehicle electric machine system supplies three-phase AC power to the motor generator 10 by converting DC (Direct Current) power of the lithium-ion battery device 1000 into three-phase AC power by use of the inverter device 20 (electric power conversion device).

In contrast, in operation modes needing electric power generation (in regenerative braking (deceleration/braking of the vehicle), when the lithium-ion battery device 1000 needs charging, etc.), the motor generator 10 is driven by driving force from the wheels or the engine and generates three-phase AC power as a generator. In this case, the in-vehicle electric machine system converts the three-phase AC power from the motor generator 10 into DC power with the inverter device 20 and supplies the DC power to the lithium-ion battery device 1000, by which electric power is accumulated in the lithium-ion battery device 1000.

The inverter device 20 is an electronic circuit device which controls the aforementioned power conversion (conversion from DC power to three-phase AC power, conversion from three-phase AC power to DC power) by the operation (ON/OFF) of switching semiconductor devices. The inverter device 20 includes a power module 21, a driver circuit 22 and a motor controller 23.

The power module 21 is a power conversion circuit which includes six switching semiconductor devices and executes the aforementioned power conversion by the switching operation (ON/OFF) of the six switching semiconductor devices.

In the power module 21, a DC positive-side module terminal and a DC negative-side module terminal are electrically connected to a DC positive-side external terminal and a DC negative-side external terminal, respectively. The DC positive-side external terminal and the DC negative-side external terminal are power supply-side terminals for supplying and receiving DC power to/from the lithium-ion battery device 1000. Power supply cables 610 and 620 extending from the lithium-ion battery device 1000 are electrically connected to the DC positive-side external terminal and the DC negative-side external terminal. AC-side module terminals are electrically connected to AC-side external terminals. The AC-side external terminals are load-side terminals for supplying and receiving three-phase AC power to/from the motor generator 10. Load cables extending from the motor generator 10 are electrically connected to the AC-side external terminals.

The motor controller 23 is an electronic circuit device for controlling the switching operation of the six switching semiconductor devices constituting the power conversion circuit. The motor controller 23 generates switching operation command signals for the six switching semiconductor devices (e.g., PWM (Pulse-Width Modulation) signals) based on a torque command supplied from an upper-level control device such as the vehicle controller 30 for controlling the whole vehicle. The command signals generated by the motor controller 23 are outputted to the driver circuit 22.

The lithium-ion battery device 1000 includes a battery module (electricity storage module) 100 for accumulating and discharging electric energy (charging/discharging of DC power) and a control device 900 (see FIG. 2) for managing and controlling the status of the battery module 100.

The battery module 100 is made up of two battery blocks (or battery packs), namely, a high potential-side battery block 100a and a low potential-side battery block 100b electrically connected in series. Each battery block stores an assembled battery. Each assembled battery is formed of a continuous structure made by electrically connecting a plurality of lithium-ion battery cells in series. The configuration of each battery block will be explained later.

An SD (Service Disconnect) switch 700 is arranged between the negative side (low potential side) of the high potential-side battery block 100a and the positive side (high potential side) of the low potential-side battery block 100b. The SD switch 700 is a safety device provided for securing the safety at the time of maintenance/check of the lithium-ion battery device 1000. The SD switch 700 is formed of an electric circuit made by electrically connecting a switch and a fuse in series. The SD switch 700 is operated by the service-person at the time of maintenance/check.

The control device 900 (see FIG. 2) includes a battery controller 300 serving as an upper-level controller (master controller) and a cell controller 200 serving as a lower-level controller (slave controller).

The battery controller 300 manages and controls the status of the lithium-ion battery device 1000 while informing the vehicle controller 30 and the motor controller 23 (upper-level control devices) of the status of the lithium-ion battery device 1000 and charge/discharge control commands (e.g., permissible charging/discharging power). The management and control of the status of the lithium-ion battery device 1000 include measurement of the voltage and the current of the lithium-ion battery device 1000, calculation of the SOC (State Of Charge), the SOH (State Of Health), etc. of the lithium-ion battery device 1000, measurement of the temperature of each battery block, outputting of commands to the cell controller 200 (a command for measuring the voltage of each lithium-ion battery cell, a command for adjusting the electric amount (amount of stored electricity) of each lithium-ion battery cell, etc.), and so forth.

The cell controller 200 (serving as the so-called hands and feet of the battery controller 300) manages and controls the status of the lithium-ion battery cells according to the commands from the battery controller 300. The cell controller 200 is formed of a plurality of integrated circuits (ICs). The management and control of the status of the lithium-ion battery cells include measurement of the voltage of each lithium-ion battery cell, adjustment of the electric amount of each lithium-ion battery cell, and so forth. Each integrated circuit, which has been assigned corresponding lithium-ion battery cells, performs the status management/control on the corresponding lithium-ion battery cells.

The aforementioned corresponding lithium-ion battery cells are used as the power supply for each integrated circuit of the cell controller 200. Therefore, the cell controller 200 and the battery module 100 are electrically connected together via connection wires 800. Voltage at the highest electric potential of the corresponding lithium-ion battery cells is applied to each integrated circuit via the connection wires 800.

The positive terminal of the high potential-side battery block 100a and the DC positive-side external terminal of the inverter device 20 are electrically connected together via a positive-side power supply cable 610. The negative terminal of the low potential-side battery block 100b and the DC negative-side external terminal of the inverter device 20 are electrically connected together via a side-side power supply cable 620.

A junction box 400 and a side-side main relay 412 are arranged in the middle of the power supply cables 610 and 620, respectively. The junction box 400 stores a relay mechanism that is made up of a positive-side main relay 411 and a precharge circuit 420. The relay mechanism is an ON-OFF unit for electrically connecting and disconnecting the circuit between the battery module 100 and the inverter device 20. The relay mechanism connects the circuit between the battery module 100 and the inverter device 20 at the startup of the in-vehicle electric machine system and disconnects the circuit at times of stoppage or abnormality of the in-vehicle electric machine system. By controlling the connection between the lithium-ion battery device 1000 and the inverter device 20 with the relay mechanism as above, a high level of safety of the in-vehicle electric machine system can be secured.

The driving of the relay mechanism is controlled by the motor controller 23. At the startup of the in-vehicle electric machine system, the motor controller 23 receives a notification indicating the completion of startup of the lithium-ion battery device 1000 from the battery controller 300. In response to the notification, the motor controller 23 drives the relay mechanism by outputting a connection command signal to the relay mechanism. When the in-vehicle electric machine system stops, the motor controller 23 receives an OFF output signal from the ignition key switch. When an abnormality has occurred to the in-vehicle electric machine system, the motor controller 23 receives an abnormality signal from the vehicle controller. In response to the OFF output signal or the abnormality signal, the motor controller 23 drives the relay mechanism by outputting a disconnection command signal to the relay mechanism.

A main relay is formed by the positive-side main relay 411 and the side-side main relay 412. The positive-side main relay 411, which is arranged in the middle of the positive-side power supply cable 610, controls the electrical connection between the positive side of the lithium-ion battery device 1000 and the positive side of the inverter device 20. The side-side main relay 412, which is arranged in the middle of the side-side power supply cable 620, controls the electrical connection between the negative side of the lithium-ion battery device 1000 and the negative side of the inverter device 20.

The precharge circuit 420 is a series circuit that is made by electrically connecting a precharge relay 421 and a resistor 422 in series. The precharge circuit 420 is electrically connected in parallel with the positive-side main relay 411.

For the startup of the in-vehicle electric machine system, the side-side main relay 412 is turned ON first and the precharge relay 421 is turned ON next. With this operation, the current supplied from the lithium-ion battery device 1000 is limited by the resistor 422 and thereafter supplied to a smoothing capacitor of the inverter to charge the smoothing capacitor. After the smoothing capacitor has been charged up to a prescribed voltage level, the positive-side main relay 411 is turned ON and the precharge relay 421 is opened. With this operation, the principal current is supplied from the lithium-ion battery device 1000 to the inverter device 20 through the positive-side main relay 411.

The junction box 400 further stores a current sensor 430. The current sensor 430 is provided for detecting the current supplied from the lithium-ion battery device 1000 to the inverter device 20. Output lines of the current sensor 430 are electrically connected to the battery controller 300. The battery controller 300 detects the current supplied from the lithium-ion battery device 1000 to the inverter device 20 based on a signal from the current sensor 430. The current detection information is supplied from the battery controller 300 to the motor controller 23, the vehicle controller 30, etc. The current sensor 430 may also be arranged outside the junction box 400. The position of detecting the current supplied from the lithium-ion battery device 1000 is not limited to the inverter device 20's side of the positive-side main relay 411; the current may also be detected on the battery module 100's side of the positive-side main relay 411.

The junction box 400 may also store a voltage sensor for detecting the voltage of the lithium-ion battery device 1000. Output lines of the voltage sensor are electrically connected to the battery controller 300 similarly to those of the current sensor 430. The battery controller 300 detects the voltage of the entire lithium-ion battery device 1000 based on an output signal from the voltage sensor. The voltage detection information is supplied to the motor controller 23, the vehicle controller 30, etc. The position of detecting the voltage of the lithium-ion battery device 1000 may either be on the battery module 100's side of the relay mechanism or on the inverter device 20's side of the relay mechanism.

Figure 2:
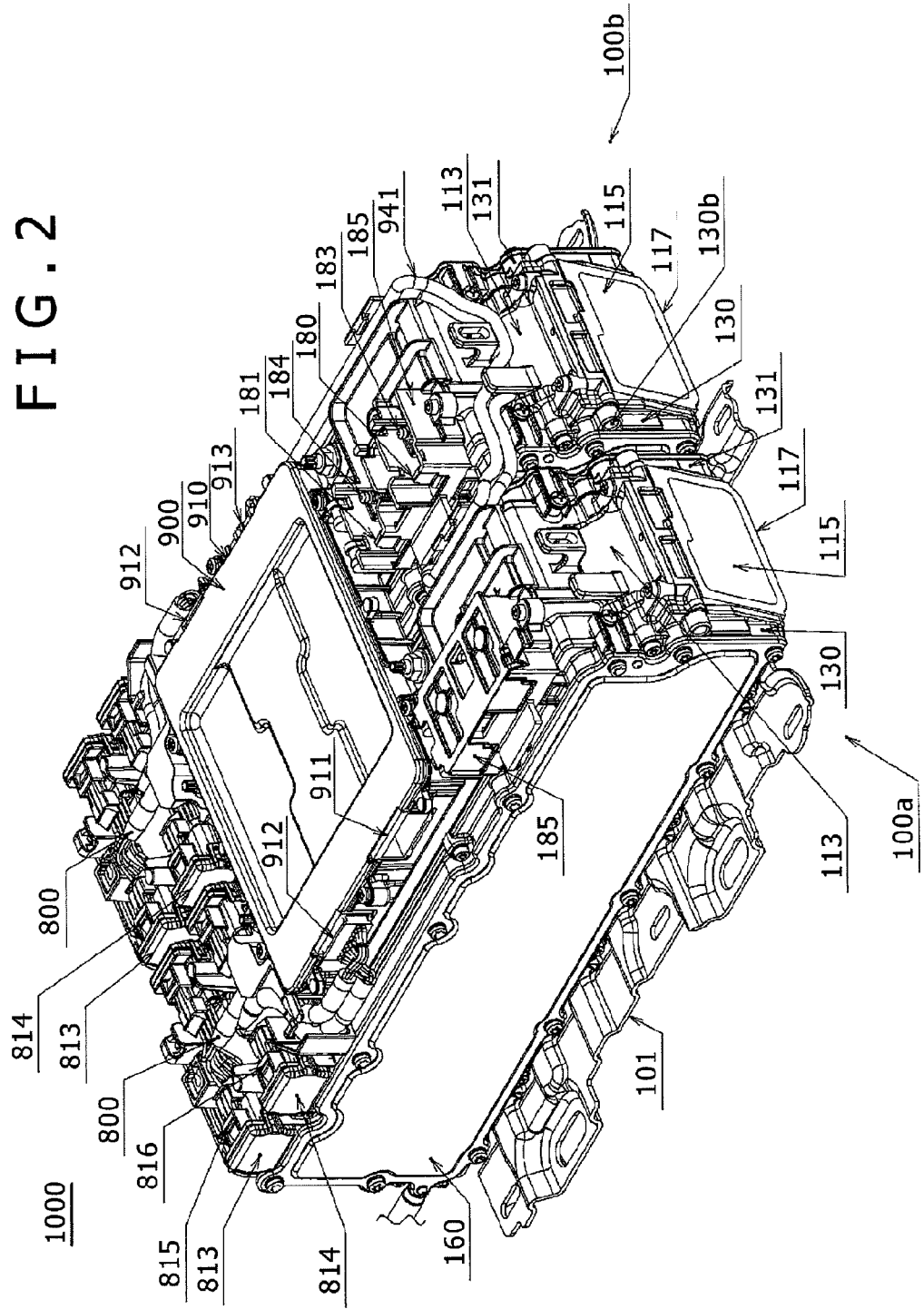
FIG. 2 is a perspective view showing the overall configuration of a lithium-ion battery device in accordance with an embodiment of the present invention.
Figure 3:
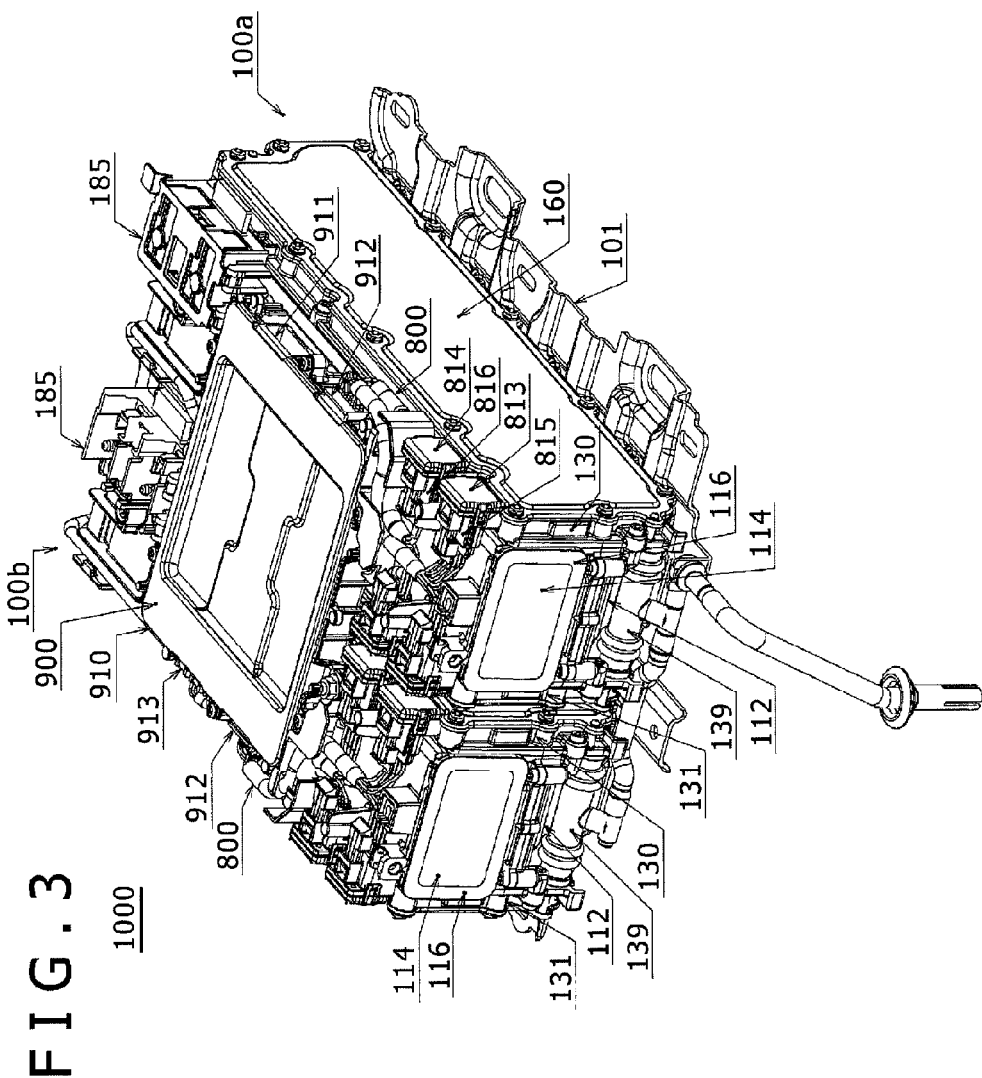
FIG. 3 is a perspective view of the lithium-ion battery device of FIG. 2 viewed from the cooling medium inlet side.
Figure 4:
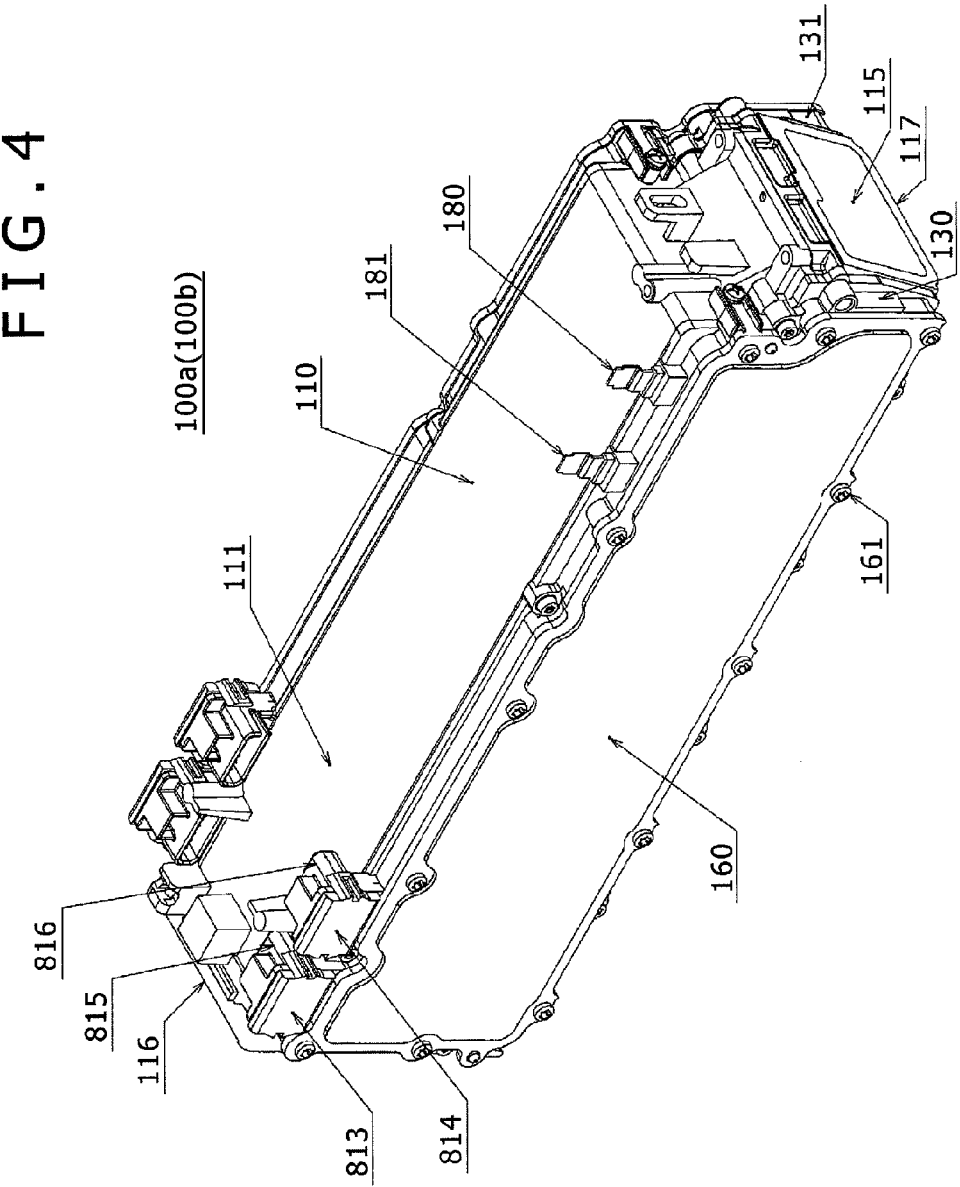
FIG. 4 is a perspective view showing the overall configuration of a battery block included in a battery module constituting the lithium-ion battery device in accordance with the embodiment.
Figure 5:
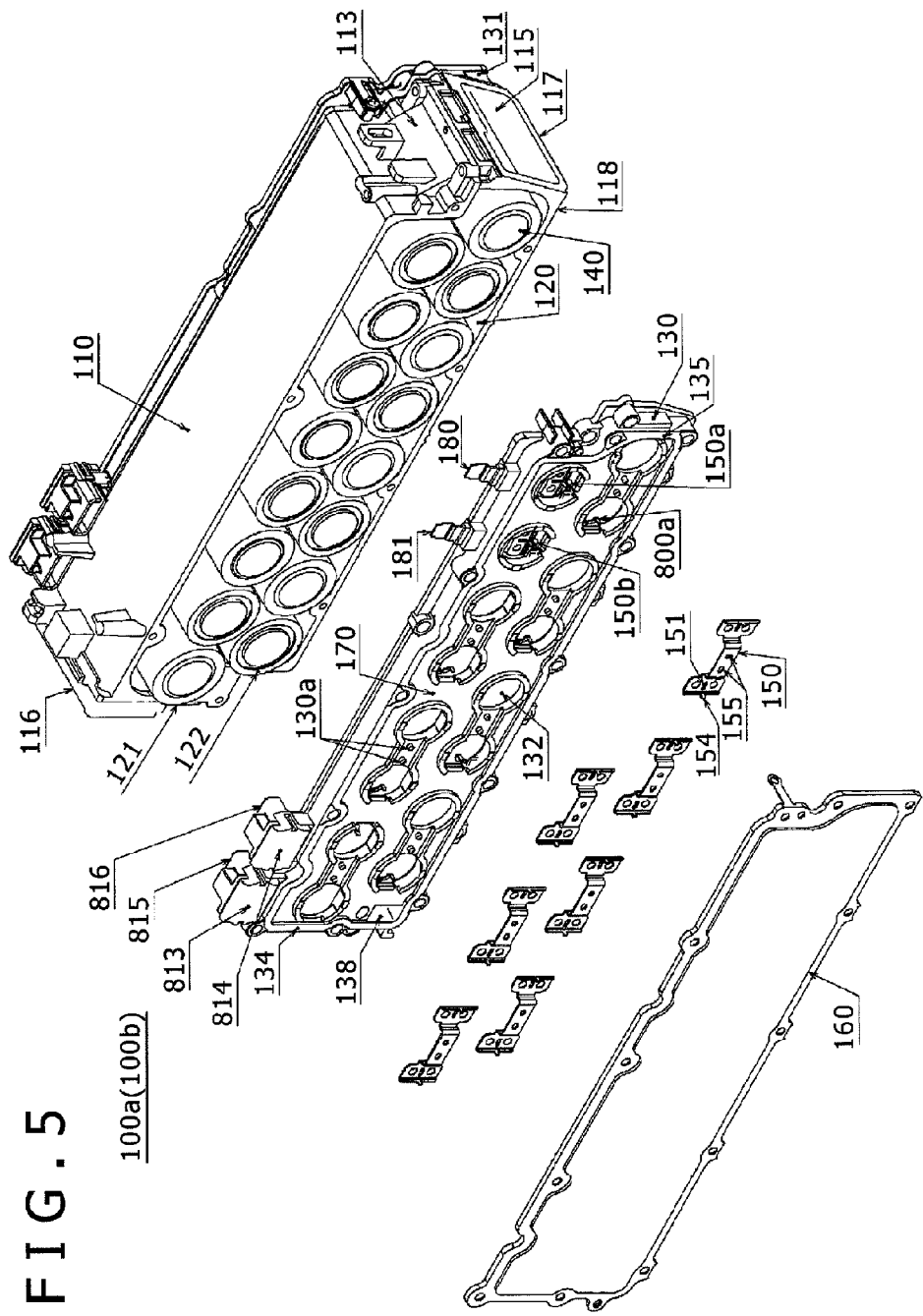
FIG. 5 is an exploded perspective view of the battery block shown in FIG. 4.

Next, the configuration of the lithium-ion battery device 1000 will be explained below referring to FIGS. 2-18. FIGS. 2 and 3 are perspective views showing the overall configuration of the lithium-ion battery device 1000. FIG. 4 is a perspective view of the battery module 100 constituting the lithium-ion battery device 1000. FIG. 5 is an exploded perspective view of the battery module 100 shown in FIG. 4.

The lithium-ion battery device 1000 is mainly composed of two units: the battery module 100 and the control device 900. First, the configuration of the battery module 100 will be explained below.

As mentioned above, the battery module 100 is made up of the high potential-side battery block 100a and the low potential-side battery block 100b and the two battery blocks 100a and 100*b* are electrically connected in series. Incidentally, the high potential-side battery block 100*a* and the low potential-side battery block 100*b* have configurations totally identical with each other. Therefore, only the high potential-side battery block 100*a* is shown in FIGS. 4 and 5 as the representative of the two battery blocks 100*a* and 100*b* and explanation of the detailed configuration of the low potential-side battery block 100*b* is omitted.

As shown in FIG. 2, the high potential-side battery block 100*a* and the low potential-side battery block 100*b* are parallelly arranged to adjoin each other so that their longitudinal directions coincide with each other. The two battery blocks 100*a* and 100*b* are mounted side by side on a module base 101 and fixed by fixation means such as bolts. The module base 101, made of a thin metal plate (e.g. steel plate) having rigidity and divided into three parts in its short-side direction, has been fixed to the vehicle. In other words, the module base 101 is formed of three members arranged in the central part and two end parts in the short-side direction. With such a configuration, the surface of the module base 101 can be made flush with the lower surfaces of the battery blocks 100*a* and 100*b* and the size of the battery module 100 in the height direction can be reduced further.

Upper parts of the high potential-side battery block 100*a* and the low potential-side battery block 100*b* are fixed by an enclosure 910 of the control device 900 which will be explained later.

As shown in FIG. 5, the high potential-side battery block 100*a* is mainly composed of a casing 110 (also called enclosure, housing or package) and an assembled battery 120. The assembled battery 120 is stored and held in the casing 110.

The casing 110 forms a block enclosure in a substantially hexahedral shape. Specifically, the casing 110 is formed by a combination of six members: an inlet channel formation plate 111, an outlet channel formation plate 118, an inlet-side guide plate 112, an outlet-side guide plate 113, and two side plates 130 and 131. The space inside the casing 110 functions not only as a storage room for storing the assembled battery 120 but also as cooling channels for the circulation of the cooling medium (cooling air) for cooling down the assembled battery 120.

In this explanation, the direction in which the length of the casing 110 is the greatest and the direction of a line extending from a cooling medium inlet 114 to a cooling medium outlet 115 are defined as a "longitudinal direction". The direction in which two side faces of the casing 110 other than the two side faces (inlet-side guide plate 112 and the outlet-side guide plate 113) facing each other in the longitudinal direction (i.e., the two side plates 130 and 131) face each other, the direction of the central axis of each lithium-ion battery cell 140 (i.e., the direction in which the two electrodes (positive electrode, negative electrode) face each other), and the direction in which a conductive member 150 (electrically connecting two lithium-ion battery cells 140) and the two lithium-ion battery cells 140 face each other are defined as a "short-side direction". Further, the direction in which the inlet channel formation plate 111 and the outlet channel formation plate 118 face each other is defined as a "height direction" irrespective of the direction of installation of the battery module 100.

The inlet channel formation plate 111 is a rectangular flat plate forming the top surface of the casing 110. The outlet channel formation plate 118 is a flat plate forming the under surface of the casing 110. The inlet channel formation plate 111 and the outlet channel formation plate 118 are shifted from each other in the longitudinal direction. Therefore, the positions of the ends of the inlet channel formation plate 111 and the outlet channel formation plate 118 in the longitudinal direction differ from each other in the longitudinal direction. The inlet channel formation plate 111 and the outlet channel formation plate 118 are formed of thin metal plates having rigidity.

The inlet-side guide plate 112 is a plate-shaped member forming one of the side faces of the casing 110 facing each other in the longitudinal direction. The outlet-side guide plate 113 is a plate-shaped member forming the other one of the side faces of the casing 110 facing each other in the longitudinal direction. The inlet-side guide plate 112 and the outlet-side guide plate 113 are formed of thin metal plates having rigidity.

Between the inlet channel formation plate 111 and the inlet-side guide plate 112, the cooling medium inlet 114 constituting the inlet for the cooling air (cooling medium) to the inside of the casing 110 is formed. The cooling medium inlet 114 is provided with a cooling medium inlet duct 116 for guiding the cooling air to the cooling medium inlet 114. As mentioned above, the inlet channel formation plate 111 and the outlet channel formation plate 118 are arranged at positions shifted from each other and the end of the casing 110 on the inlet side is formed in a step-like shape. Thus, a space is formed between the cooling medium inlet 114 and the inlet-side guide plate 112 in regard to the longitudinal direction. This space stores a gas discharge pipe 139 which will be explained later. As shown in FIG. 3, the inlet-side guide plate 112 is arranged to the rear of the gas discharge pipe 139. With such a configuration, the size of the battery module 100 in the longitudinal direction can be reduced. Between the outlet channel formation plate 118 and the outlet-side guide plate 113, the cooling medium outlet 115 constituting the outlet for the cooling air from the inside of the casing 110 is formed. The cooling medium outlet 115 is provided with a cooling medium outlet duct 117 for guiding the cooling air from the cooling medium outlet 115 to the outside.

The positions of the cooling medium inlet 114 and the cooling medium outlet 115 are shifted from each other in the height direction (in which the inlet channel formation plate 111 and the outlet channel formation plate 118 face each other). Specifically, the cooling medium inlet 114 is situated closer to the inlet channel formation plate 111 while the cooling medium outlet 115 is situated closer to the outlet channel formation plate 118.

The inlet channel formation plate 111, the outlet-side guide plate 113, the cooling medium inlet 114 and the cooling medium inlet duct 116 are formed integrally in consideration of the assembling efficiency of the battery block. Similarly, the outlet channel formation plate 118, the inlet-side guide plate 112, the cooling medium outlet 115 and the cooling medium outlet duct 117 are formed integrally in consideration of the assembling efficiency of the battery block.

The joining between each side plate 130, 131 and the inlet channel formation plate 111, the outlet channel formation plate 118, the inlet-side guide plate 112, the outlet-side guide plate 113, the cooling medium inlet 114 and the cooling medium outlet 115 is made by use of fixation means such as screws, bolts or rivets. Sealing members (not shown) are arranged between the joined parts of the above joined members in order to increase the hermeticity of the casing 110 and allow the cooling medium (introduced into the inside of the casing 110 through the cooling medium inlet 114) to be discharged through the cooling medium outlet 115 without leaking out.

The side plates 130 and 131 are flat plate-shaped members forming the two side faces of the casing 110 facing each other in the short-side direction. The side plates 130 and 131 are molded members made of resin having the electrically insulating property (e.g., PBT). The wall thickness of each side plate 130, 131 is greater than those of the inlet channel formation plate 111, the outlet channel formation plate 118, the inlet-side guide plate 112 and the outlet-side guide plate 113. The detailed configuration of the side plates 130 and 131 will be described later.

A cover member 160 called a "side cover" is arranged outside each side plate 130, 131, that is, on the side opposite to the storage room of the assembled battery 120. While only one cover member 160 outside the side plate 130 is shown in FIG. 5, there is another cover member 160 arranged outside the side plate 131. The cover member 160 outside the side plate 130 is fixed to the side plate 130 by use of fixation means 161 such as bolts or rivets.

The cover member 160 is a flat plate formed by press work of a metal plate made of steel, aluminum, etc. or a flat plate formed by molding of resin such as PBT. The cover member 160 is formed substantially in the same planar shape as the side plate 130. An area of the cover member 160 including a part corresponding to through holes 132 of the side plate 130 (explained later) protrudes evenly in a direction opposite to the side plate 130, by which a space is formed between the cover member 160 and the side plate 130. This space functions as a gas discharge room (or a gas discharge channel) through which mist-like gas spouting out from the lithium-ion battery cell 140 is discharged separately from the cooling medium circulated in the cooling channels.

The assembled battery 120 is an aggregation of a plurality of lithium-ion battery cells 140 (lithium-ion battery cell set). The lithium-ion battery cells 140 are arrayed and stored in the storage room formed inside the casing 110, while being sandwiched between the side plates 130 and 131 in the short-side direction and being electrically connected in series through contact with a plurality of conductive members 150 called "bus bars".

The lithium-ion battery cell 140 is a structure in a cylindrical shape formed by storing components such as a battery element and a safety valve in a battery case filled with electrolytic solution. The safety valve on the positive side is a cleavage valve which cleaves when the pressure inside the battery case has risen to a prescribed pressure due to abnormality such as the overcharge. The safety valve functions as a fuse mechanism which blocks the electrical connection between the positive side of the battery element and a battery cover by cleaving, while also functioning as a pressure reducing mechanism which allows the gas generated inside the battery case (mist-like carbonic acid-based gas containing the electrolytic solution (spouting matter)) to spout out from the battery case.

The negative side of the battery case is also provided with a cleaving groove, which cleaves when the pressure inside the battery case has risen to a prescribed pressure due to abnormality such as the overcharge. By the cleaving groove, the gas generated inside the battery case is allowed to spout out also from the negative side. The nominal output voltage of the lithium-ion battery cell 140 is 3.0-4.2 V (average nominal output voltage: 3.6 V).

In this embodiment, the assembled battery 120 is formed by arraying sixteen cylindrical lithium-ion battery cells 140 inside the casing 110. Specifically, a first battery cell line 121 is formed by arranging eight lithium-ion battery cells 140 in parallel (each lithium-ion battery cell 140 being laid horizontally with its central axis extending in the short-side direction). A second battery cell line 122 is formed by arranging eight lithium-ion battery cells 140 in the same way as the first battery cell column 121. The assembled battery 120 is constructed by stacking (stage stacking or bale stacking) the first battery cell line 121 and the second battery cell line 122 in the height direction. Thus, the assembled battery 120 is formed by arranging eight lithium-ion battery cells 140 in the longitudinal direction and two stages or layers of lithium-ion battery cells 140 in the height direction.

The first battery cell line 121 and the second battery cell line 122 are shifted from each other in the longitudinal direction. Specifically, the first battery cell line 121 is arranged to be closer to the inlet channel formation plate 111 and the cooling medium inlet 114 compared to the second battery cell line 122. On the other hand, the second battery cell line 122 is arranged to be closer to the outlet channel formation plate and the cooling medium outlet 115 compared to the first battery cell line 121. As shown in FIG. 5, the first battery cell line 121 and the second battery cell line 122 in this embodiment are shifted from each other in the longitudinal direction so that the central axis of a lithium-ion battery cell 140 of the first battery cell line 121 closest to the cooling medium outlet 115 is situated at an intermediate position in the longitudinal direction in between the central axis of a lithium-ion battery cell 140 of the second battery cell line 122 closest to the cooling medium outlet 115 and the central axis of the adjacent lithium-ion battery cell 140 of the second battery cell line 122, for example.

The lithium-ion battery cells 140 forming the first battery cell line 121 are arranged so that their terminal directions alternate. The lithium-ion battery cells 140 forming the second battery cell line 122 are also arranged so that their terminal directions alternate. However, the order of arrangement of the terminals of the lithium-ion battery cell 140 of the first battery cell line 121 (from the cooling medium inlet 114's side to the cooling medium outlet 115's side) differs from that of the terminals of the lithium-ion battery cell 140 of the second battery cell line 122. Specifically, in the first battery cell line 121, the terminals of the lithium-ion battery cells 140 facing the side plate 130 are negative, positive, negative, and positive from the cooling medium inlet 114's side to the cooling medium outlet 115's side. In contrast, the terminals of the lithium-ion battery cells 140 of the second battery cell line 122 facing the side plate 130 are positive, negative, positive, . . . , and negative from the cooling medium inlet 114's side to the cooling medium outlet 115's side.

By arranging the first battery cell line 121 and the second battery cell line 122 while shifting them from each other in the longitudinal direction as above, the size of the assembled battery 120 in the height direction can be reduced and the high potential-side battery block 100a can be downsized in the height direction.

Next, the configuration of the side plates 130 and 131 sandwiching the assembled battery 120 from both side will be explained in detail. While only the configuration of the side plate 130 on one side will be described here for the simplicity of the explanation, the other side plate 131 is also configured basically in the same way as the side plate 130.

Nevertheless, only the side plate 130 is provided with a battery module-side connection terminal 180 which is electrically connected to the positive side of the assembled battery 120 and a battery module-side connection terminal 181 which is electrically connected to the negative side of the assembled battery 120. The connection terminals 180 and 181 are arranged on the top surface of the side plate 130 (i.e., a surface of the side plate 130 facing the inlet channel formation plate 111) side by side in the longitudinal direction. To the connection terminals 180 and 181, a DC positive-side input/output terminal 183 and a negative-side input/output terminal 184 (formed as a subassembly 185 separately from the battery module 100) are connected, respectively. To the positive-side input/output terminal 183 of the high potential-side battery block 100a, a terminal of the positive-side power supply cable 610 is connected. To the negative-side input/output terminal 184 of the high potential-side battery block 100a, a terminal of a cable electrically connected to one end of the SD switch 700 is connected (see FIG. 1). To the positive-side input/output terminal 183 of the low potential-side battery block 100b, a terminal of a cable electrically connected to the other end of the SD switch 700 is connected. To the negative-side input/output terminal 184 of the low potential-side battery block 100b, a terminal of the side-side power supply cable 620 is connected. In FIGS. 2 and 3, the subassembly 185 of the high potential-side battery block 100a is shown in a state covered by a terminal cover, while the subassembly 185 of the low potential-side battery block 100b is shown in a state after detaching the terminal cover.

The side plate 130 is formed in a substantially rectangular and flat plate-like shape as shown in FIG. 5. The side plate 130 has sixteen circular through holes 132 formed to penetrate it in the short-side direction. The sixteen through holes 132 have been formed in conformity with the arrangement of the sixteen lithium-ion battery cells 140, so as to have openings corresponding to the terminal positions of the sixteen lithium-ion battery cells 140 arranged as explained above. Therefore, when the assembled battery 120 is stored in the casing 110, the sixteen through holes 132 of the side plate 130 are shut and covered by terminal faces on one side of the sixteen lithium-ion battery cells 140, and the sixteen through holes 132 of the side plate 131 are shut and covered by terminal faces on the other side of the sixteen lithium-ion battery cells 140.

On an exterior surface 170 of the side plate 130 opposite to an interior surface forming the storage room for the assembled battery 120, protruding parts (peripheral wall parts) 133 are formed to partially surround the through holes 132. Each peripheral wall part 133 surrounds two through holes 132 while also extending between the two through holes along a central part 156 of the conductive member 150. However, the peripheral wall part 133 is not formed at a part of the periphery of a through hole 132 where a tip end part 800a of a voltage detection conductor 805 (explained later) is arranged.

The exterior surface 170 of the side plate 130 is further provided with a plurality of fixation guides 130a each arranged between two through holes 132. The fixation guides 130a are used for setting the conductive members 150 to be connected to the lithium-ion battery cells 140. The peripheral wall parts 133 and the fixation guides 130a are configured to protrude from the exterior surface 170 and to prevent the conductive members 150 from contacting the cover member 160. The height of the peripheral wall parts 133 from the side plate 130, 131 is desired to be greater than or equal to the height of the fixation guides 130a from the side plate 130, 131. With this configuration, even when the cover member 160 (formed of a flat plate made of metal (e.g., steel), for example) is deformed by external force, the cover member 160 makes contact with the peripheral wall parts 133 first and the short circuit between the cover member 160 and the conductive members 150 can be prevented with high reliability.

The side plate 130 is formed to have a gas discharge channel 138. The gas discharge channel 138 is used for discharging the gas spouting into the gas discharge room between the side plate 130 and the cover member 160 (mixture of gas and liquid containing the electrolytic solution, etc.) to the outside of the high potential-side battery block 100a. An opening of the gas discharge channel 138 is formed in the lower part of the side plate 130 in consideration of the discharge (draining) of the liquid (e.g., the electrolytic solution contained in the gas). Specifically, the opening of the gas discharge channel 138 is formed at a position on the side plate 130 close to the lithium-ion battery cell 140 and the outlet channel formation plate 118. The end of the gas discharge channel 138 is formed in a pipe-like shape, to which the gas discharge pipe 139 (see FIG. 3) for guiding the gas from the gas discharge channel 138 to the outside is connected.

Figure 6:
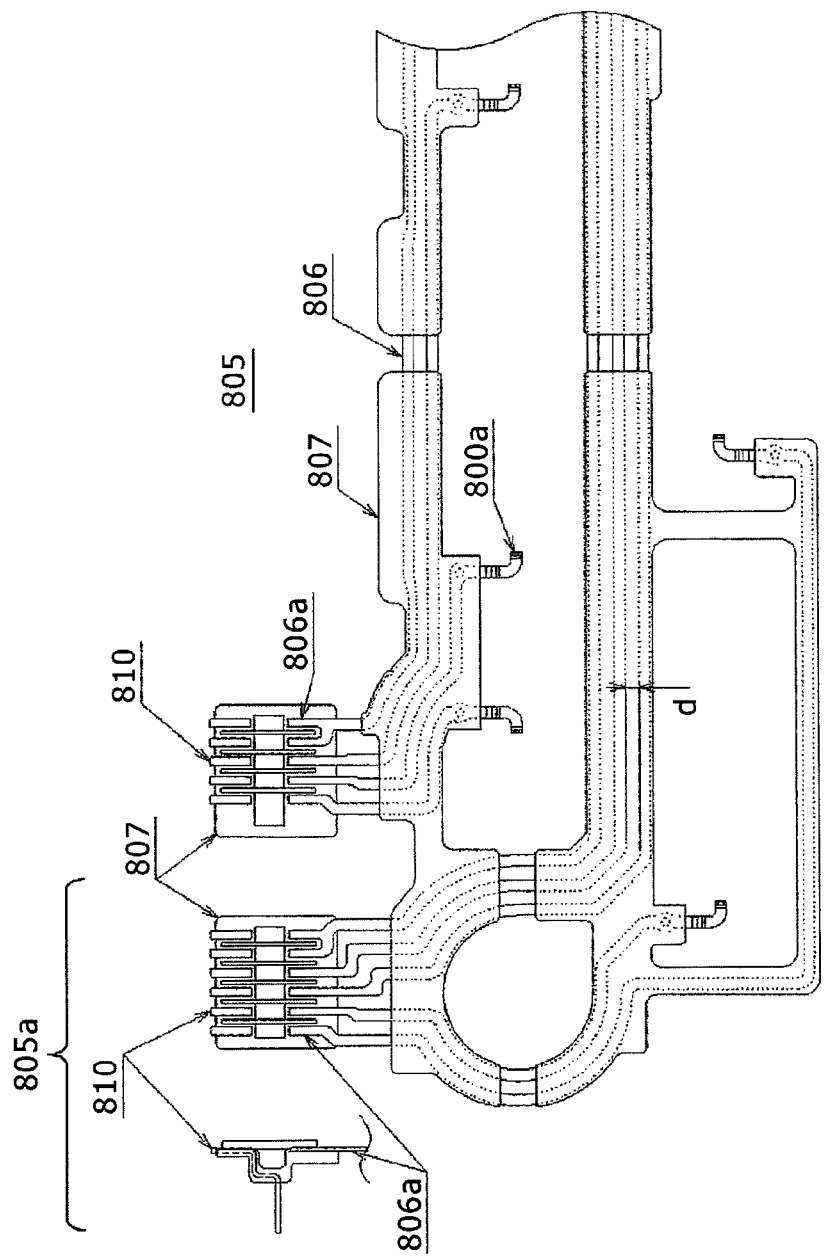
FIG. 6 is a schematic diagram showing the configuration of a voltage detection conductor.
Figure 7:
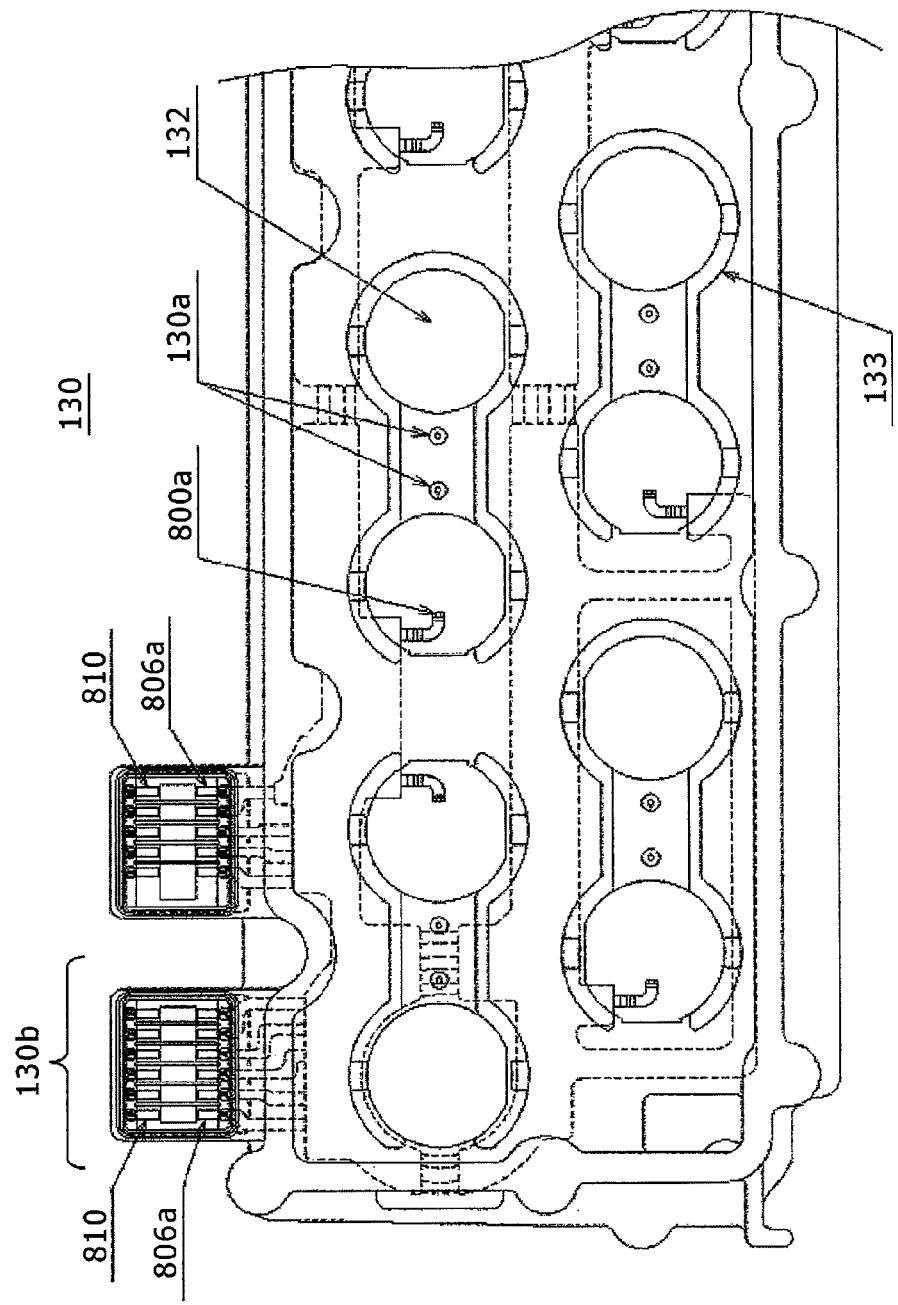
FIG. 7 is a schematic diagram showing a state in which the voltage detection conductor has been embedded in a side plate.

The voltage detection conductor 805 is connected to the conductive members 150 (connecting the lithium-ion battery cells 140 in series) in order to detect the voltage of each of the lithium-ion battery cells 140 forming the assembled battery 120. The voltage detection conductor 805 is formed integrally with the side plate 130. Specifically, the voltage detection conductor 805 is embedded in the side plate 130. FIG. 6 shows an example of the shape of the voltage detection conductor 805. FIG. 7 shows a state in which the voltage detection conductor 805 shown in FIG. 6 has been embedded in the side plate 130.

Each detection line 806 of the voltage detection conductor 805 is formed in a shape like a thin flat rectangular wire as shown in FIG. 6 by shaping a thin metal plate (e.g., copper plate) by press work, for example. The voltage detection conductor 805 is configured so that each detection line 806 extends without protruding from any through hole 132 of the side plate 130 and the tip end part 800a of each detection line 806 is exposed from a prescribed through hole 132. The tip end part 800a is bent outward with respect to the storage room for the assembled battery 120 and connected to the conductive member 150. A fuse connection terminal 806a at the other end of each detection line 806 opposite to the tip end part 800a is electrically connected to a side plate connector terminal 810 of a side plate connector 815 via a fuse wire 817 which will be explained later.

The shape of the voltage detection conductor 805 has been designed to efficiently utilize the usable space of the side plate 130 in order to downsize the side plate 130 and thereby downsize the entire battery module 100. Since the lithium-ion battery cells 140 are connected in series via the conductive members 150, a potential difference occurs between the conductive members 150 to which the voltage detection conductor 805 is connected. Therefore, the arrangement of the detection lines 806 of the voltage detection conductor 805 has been determined so that the potential difference between adjacent detection lines 806 becomes as small as possible. Incidentally, the configuration of the voltage detection conductor 805 is not restricted to that shown in FIG. 6; the configuration may be modified depending on the specifications, etc.

The detection lines 806 and the side plate connector terminals 810 of the voltage detection conductor 805 are first formed into prescribed shapes by press work, etc. Thereafter, the shapes of the detection lines 806 and the side plate connector terminals 810 are fixed by a resin part 807 made of the same resin as the side plate 130, for example. Specifically, the resin part 807 serves for retaining the detection lines 806 and the side plate connector terminals 810 in a state separated from one another and fixing them to maintain their shapes. The voltage detection conductor 805 shown in FIG. 6 is configured by fixing the detection lines 806 and the side plate connector terminals 810 with the resin part 807 at multiple positions.

The voltage detection conductor 805 fixed by the resin part 807 as shown in FIG. 6 is integrated with the side plate 130 by insert molding by use of the resin constituting the side plate 130, for example. Since the detection lines 806 and the side plate connector terminals 810 have been fixed in the state separated from one another, substantially no short circuit occurs among the detection lines 806 and the side plate connector terminals 810 after the integration of the voltage detection conductor 805 and the side plate 130. Incidentally, for the prevention of the short circuit between the detection lines 806 and between the side plate connector terminals 810 in the voltage detection conductor 805, it is necessary to secure an insulation creepage distance in regard to the distance d between the detection lines 806 and between the side plate connector terminals 810. The insulation creepage distance is determined based on the use environment and the voltage of the system according to international standards.

However, in consideration of the pollution level of the environment in which the system including the electricity storage module of this embodiment is used, the distance d between the detection lines 806 and between the side plate connector terminals 810 has been set greater than the insulation creepage distance in order to further increase the reliability against the short circuit of the detection lines 806 and the side plate connector terminals 810. Although the greater distance d is more effective against highly polluted environments, the usable space of the side plate 130 is limited. Thus, in view of the prevention of the short circuit and the usable space of the side plate 130, the distance d between the detection lines 806 and between the side plate connector terminals 810 in this embodiment is set at 2-2.5 times the insulation creepage distance necessary in the system. This makes it possible to provide side plates 130 having high reliability.

Next, the configuration of fuse boxes 813 and 814 which are arranged on a surface (edge) of the side plate 130 close to the inlet channel formation plate 111 (part of the surface close to the cooling medium inlet 114) and side plate connectors 815 and 816 which are arranged back to back with and integrally with the fuse boxes 813 and 814, respectively, will be explained below (see FIG. 4). While this explanation of the configuration will be given only of the fuse box 813 and the side plate connector 815 as a pair for the sake of simplicity, the fuse box 814 and the side plate connector 816 as the other pair are also configured basically in the same way as the fuse box 813 and the side plate connector 815 (ditto for the fuse boxes and the side plate connectors arranged on the other side plate 131). Incidentally, while each side plate is provided with two pairs of fuse boxes and side plate connectors in this embodiment, the number of the pairs can either be one or two or more depending on the specifications. The pairs may be arranged at any positions on the periphery of the side plate.

Figure 8:
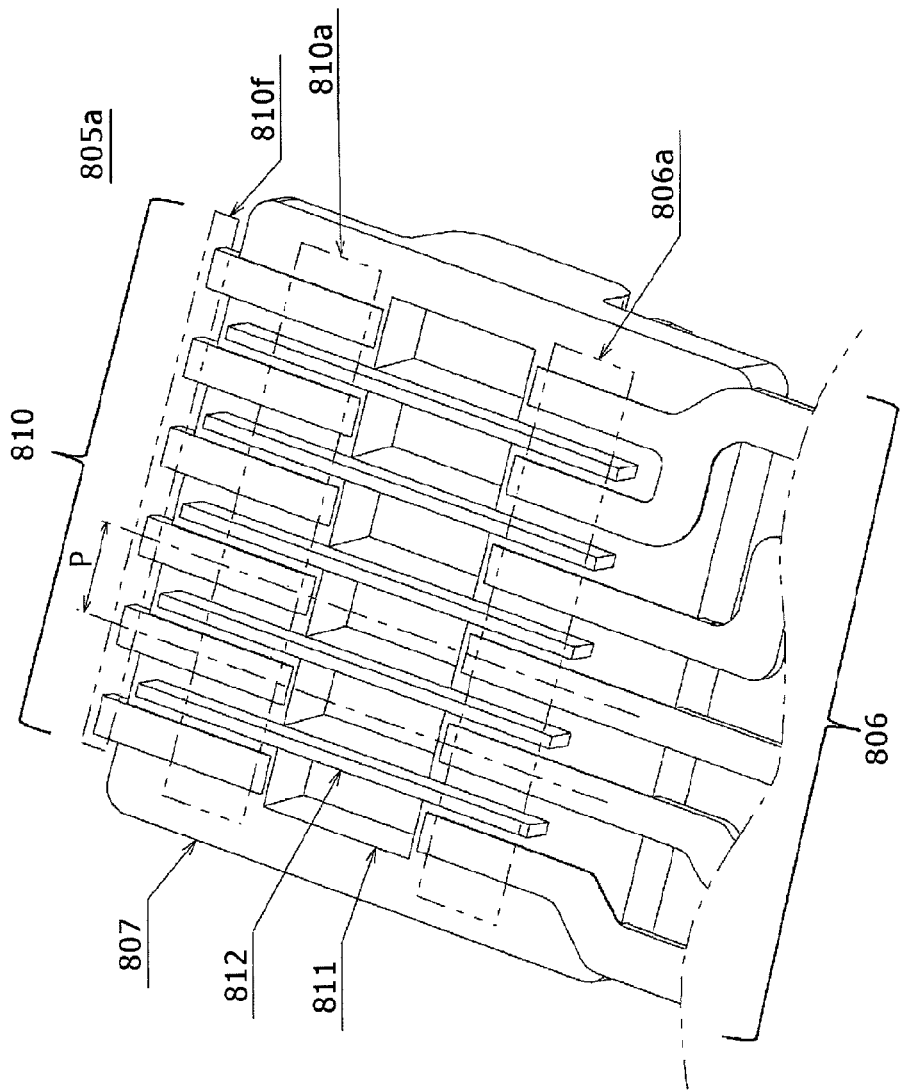
FIG. 8 is a perspective view of a primary formation part which forms a fuse box and a side plate connector.
Figure 10:
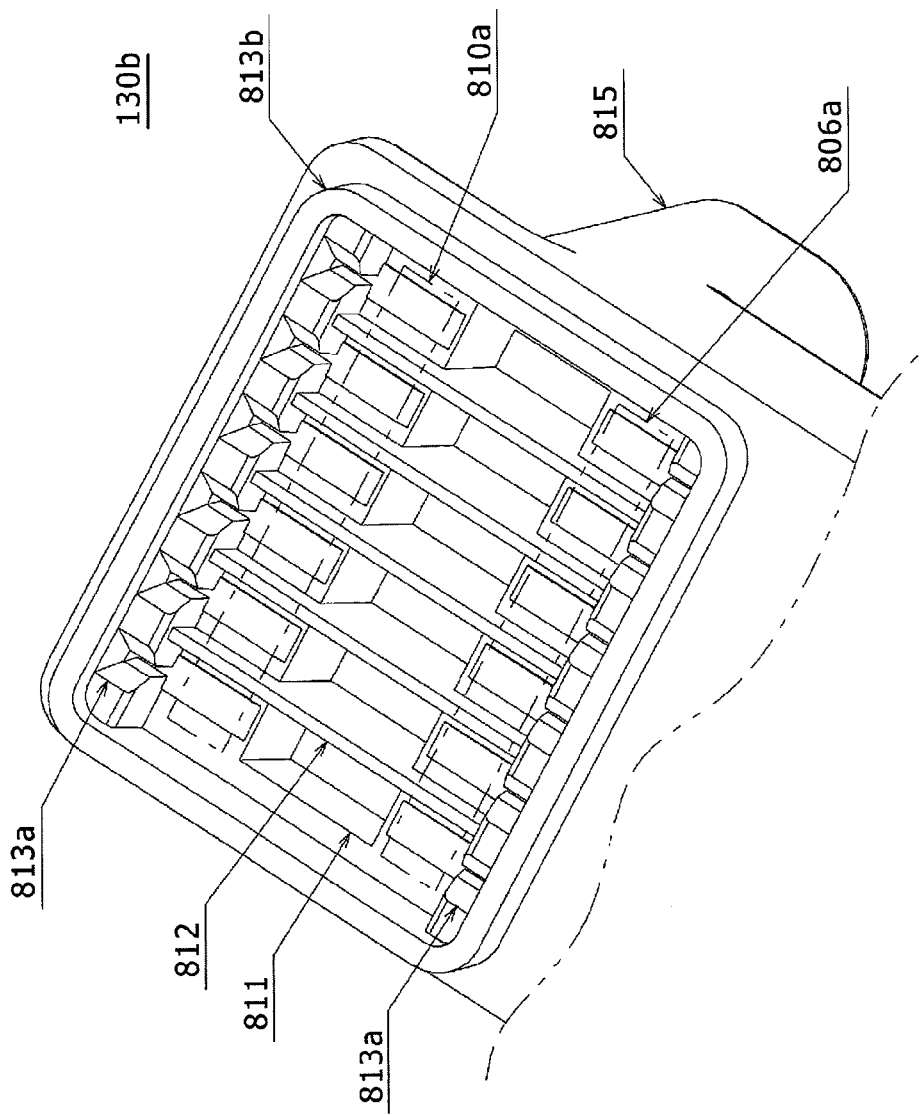
FIG. 10 is a perspective view showing a state after fuse box secondary formation.

The fuse box 813 and the side plate connector 815 are formed by secondary formation. In the first step, as shown in FIGS. 6 and 8, parts of the fuse box 813 and the side plate connector 815 having complex structure/shape are formed as a fuse box primary formation part 805a of the voltage detection conductor 805. In the second step, as shown in FIGS. 7 and 10, the fuse box 813 and the side plate connector 815 are completed by forming relatively simple shapes (outline, etc.) by secondary formation.

The details of the fuse box primary formation part 805a will be explained below referring to FIG. 8. The fuse box primary formation part 805a integrates the detection lines 806 and the side plate connector terminals 810 together by use of the resin part 807, while also forming part of a structure for the connection of the fuse wires 817 which will be explained later. The fuse connection terminal 806a of each detection line 806 opposite to the tip end part 800a (see FIG. 6) and a fuse connection part 810a of each side plate connector terminal 810 are arranged in the short-side direction of the side plate 130 as a pair. Six pairs of fuse connection terminals 806a and fuse connection parts 810a are arranged in the longitudinal direction of the side plate 130 at fixed intervals (constant pitch).

The pitch P between adjacent pairs of fuse connection terminals 806a and fuse connection parts 810a has been set in conformity with the specifications of the connectors to be connected to the side plate connector 815 (i.e., specifications of the connectors of the connection wires 800) while securing the insulation creepage distance in regard to the distance d shown in FIG. 6. The width of the fuse connection terminal 806a and the width of the fuse connection part 810a have been set at values appropriate for the method of connecting the fuse wire 817. While the widths of the fuse connection terminal 806a and the fuse connection part 810a are simply set uniform in this embodiment in consideration of easiness of the manufacture of each terminal component, the widths may be set freely to suit the method of connecting the fuse wire 817. For example, in cases where the fuse wire 817 is connected by resistance welding, the width of the connection part does not have to be uniform as long as a sufficient area for letting an electrode contact the terminal surface can be secured. In this embodiment, a thin metal wire in a cylindrical shape, not needing a large area for the connection, is used as the fuse wire 817, and thus there are less design restrictions on the connection surface caused by the shape of the fuse wire 817. Incidentally, the fuse wire 817, which is a wire having certain resistance, can also be called a "resistance wire".

The fuse wire connection surface of the fuse connection terminal 806a and that of the fuse connection part 810a are on the same plane. Further, the fuse wire connection surfaces of the fuse connection terminal 806a and the fuse connection part 810a are on the same plane with or slightly protruding from the plane (surface) of the resin part 807 which is in parallel with the fuse wire connection surfaces. This is for facilitating the setting of the fuse wire 817 on the fuse wire connection surfaces of the fuse connection terminal 806a and the fuse connection part 810a when the fuse wire 817 (explained later) is connected to the fuse wire connection surfaces while holding the side plate 130 with its exterior surface 170 facing upward and extending in parallel with the floor surface. By letting each fuse wire connection surface slightly protrude from the parallel surface of the resin part 807, the connection of the fuse wire 817 to the fuse wire connection surface can be facilitated. For example, when the fuse wire 817 is connected by resistance welding, the tip end of the welding electrode is prevented from contacting the surface of the resin part 807 and the connection can be made successfully even when the tip end of the welding electrode runs off or sticks out from the terminal surface. In cases where the tip end of the welding electrode does not stick out from the terminal surface, the fuse wire connection surfaces may be set on the same plane with the surface of the resin part 807.

Adjacent pairs of fuse connection terminals 806a and fuse connection parts 810a are separated from each other by a partition wall 812. Between the fuse connection terminal 806a and the fuse connection part 810a forming a pair, a fuse storage room 811 for accommodating a curved part 817b (central part) of the fuse wire 817 is formed (details will be explained later). Although not shown in FIG. 8, a terminal end part 810b (see FIGS. 13 and 14) as the other end of the side plate connector terminal 810 protrudes to the back of the fuse connection part 810a.

Figure 9:
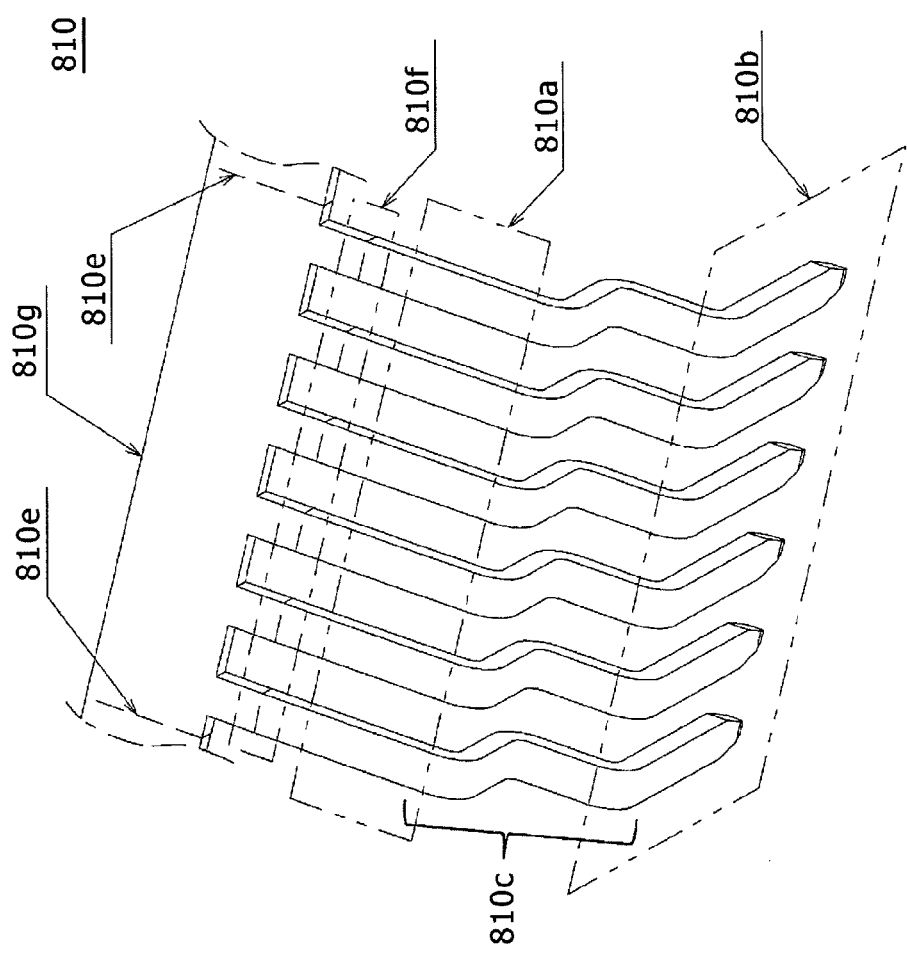
FIG. 9 is a perspective view of side plate connector terminals.

Next, the side plate connector terminals 810 will be explained in detail referring to FIG. 9. The side plate connector terminals 810 are designed in conformity with the terminal specifications of the connectors to be connected to the side plate connector 815 (i.e., specifications of the connectors of the connection wires 800). The side plate connector terminals 810 are made by performing a plating process on flat plate terminals made by press work of a metal plate (phosphor bronze plate, brass plate, etc.) having a necessary thickness. The tip end part 800*a* at the other end of each detection line 806 opposite to the fuse connection terminal 806*a* is connected to each individual lithium-ion battery cell 140 via the conductive member 150. Therefore, the material of the detection lines 806 can be restricted by the method of the connection of the detection lines 806 to the conductive members 150. While the detection lines 806 are connected to the conductive members 150 by arc welding in this embodiment, a material matching the terminal specifications of the connectors to be connected to the side plate connector 815 can be used for the side plate connector terminals 810 thanks to the connection of the side plate connector terminals 810 to the detection lines 806 via the fuse wires 817.

The manufacturing method of the side plate connector terminals 810 of this embodiment is press work by use of progressive dies, and thus the side plate connector terminals 810 are manufactured by the press work in a state linked together by a linkage part 810*g*. By successive press steps, the side plate connector terminals 810 in the linked state are cut at a linkage separation part 810*f* and separated into a necessary number of terminals. The number of side plate connector terminals 810 of the side plate connector 815 in this embodiment is six, for example. The six terminals are manufactured as a set.

The side plate connector terminal 810 has a bending part 810*c* between the fuse connection part 810*a* and the terminal end part 810*b*. The position of the side plate connector 815 on the side plate 130 and the position of the side plate connector terminal 810 are set by adjusting the length and the number of times of bending of this bending part 810*c* (details will be explained later).

After the primary formation of the side plate connector terminals 810 linked together by the linkage part 810*g* (in the state of the side plate connector 815), the side plate connector terminals 810 are cut and separated from one another at the terminal separation part 810*f* shown in FIG. 8. While the side plate connector terminals 810 are integrated together by the resin part 807 as shown in the fuse box primary formation part 805*a* in FIG. 8, the side plate connector terminals 810 are electrically separated from one another by the cutting at the terminal separation part 810*f* after the formation. By this method, the need of forming each side plate connector terminal 810 one by one by the insertion into a die is eliminated and the voltage detection conductor 805 and the side plate 130 can be manufactured with high efficiency.

Figure 14:
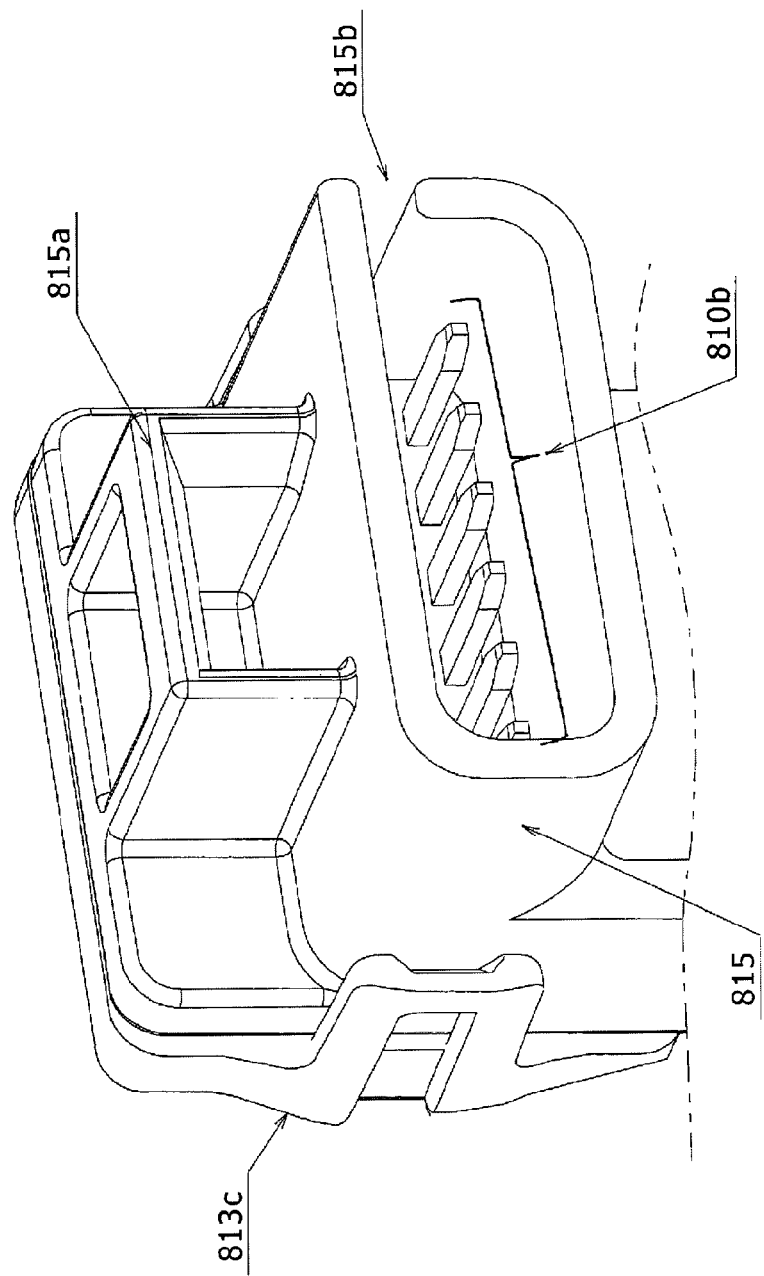
FIG. 14 is a perspective view of the side plate connector.

Next, a fuse box secondary formation part 130*b* will be explained in detail referring to FIG. 10. The fuse box secondary formation part 130*b* is formed by inserting the fuse box primary formation part 805*a* (part of the voltage detection conductor 805) into the die of the side plate 130 and performing the secondary formation. In this process, parts of the fuse box primary formation part 805*a* related to the connection of the fuse wires 817 (i.e., the fuse connection terminals 806*a*, the fuse connection parts 810*a*, the fuse storage rooms 811 and the partition walls 812) are formed in a state of being fully pressed with the die of the side plate 130 (secondary formation). With this method, the parts related to the connection of the fuse wires 817 can be formed in an exposed state and the fuse box secondary formation part 130*b* can be formed while avoiding the inflow of the resin used for the secondary formation. Parts forming the side plate connector 815 shown in FIG. 14 are also formed similarly to the formation of the fuse box secondary formation part 130*b*.

The fuse wire connection-related parts of the fuse box primary formation part 805*a* (related to the connection of the fuse wires 817) that are exposed even after the formation of the fuse box secondary formation part 130*b* are the fuse connection terminals 806*a* and the fuse connection parts 810*a* for the connection of the fuse wires 817, the fuse storage rooms 811 for accommodating the curved parts 817*b* (central parts) of the fuse wires 817, and the partition walls 812 separating adjacent pairs of fuse connection terminals 806*a* and fuse connection parts 810*a*. Parts that are formed by the formation of the fuse box secondary formation part 130*b* are fuse positioning parts 813*a* for positioning and fixing both of the end parts 817*a* of the fuse wires 817 and a peripheral wall 813*b* surrounding the contents of the fuse box.

Figure 11:
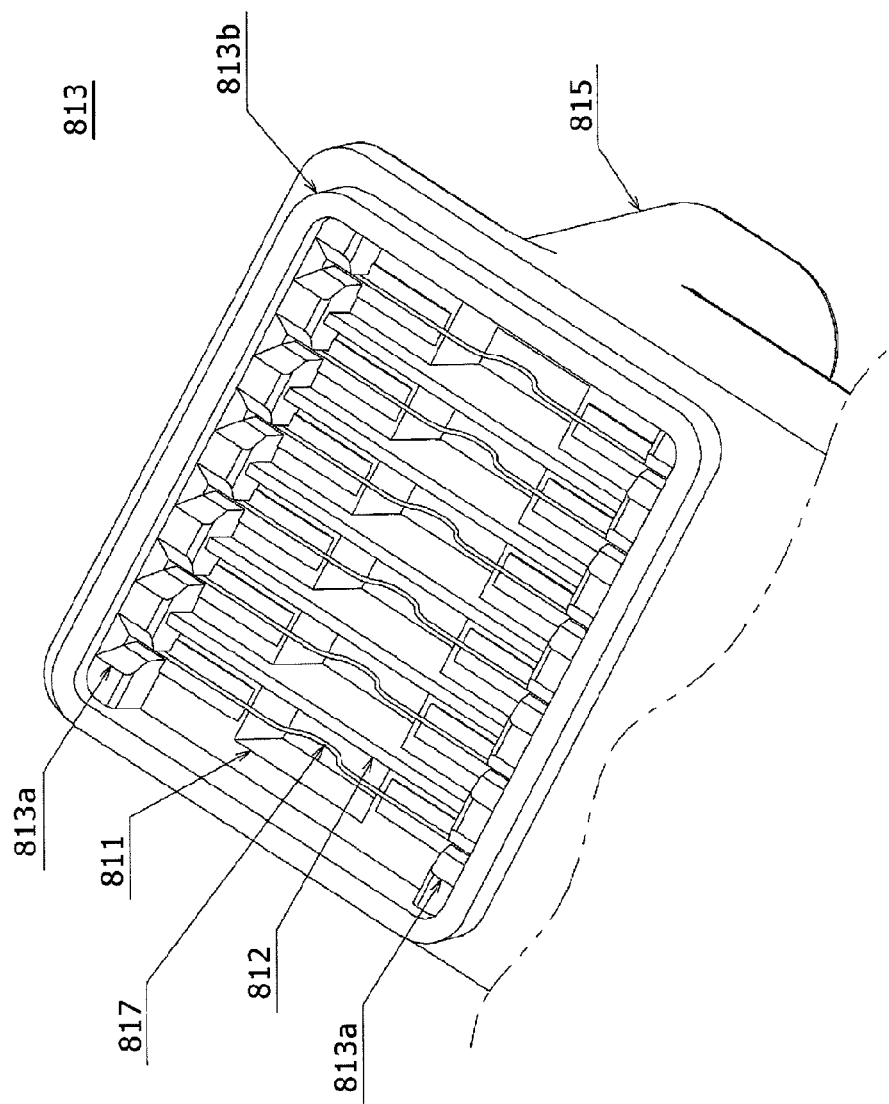
FIG. 11 is a perspective view of the fuse box wherein silicone gel and a cap are not shown.

The fuse positioning parts 813*a* are formed along the inner surface of the peripheral wall 813*b*. Each fuse positioning part 813*a* is provided for one fuse connection terminal 806*a* or one fuse connection part 810*a*. Since the connection of the fuse wires 817 is made while holding the side plate 130 with its exterior surface 170 facing upward and extending in parallel with the floor surface, the fuse positioning parts 813*a* are formed in shapes that facilitate the entry of the fuse wires 817 into connecting positions when the fuse wires 817 are set at the connecting positions. Specifically, each fuse positioning part 813*a* has a shape in which each of its three surfaces (in three directions) extending upward from the connection surface (bottom) changes its angle in two steps. The three surfaces in the first stage from the terminal surface are at substantially 90 degrees. Two of the surfaces facing each other have a gap between them. The next three surfaces in the second stage are inclined surfaces, substantially leaning outward from the upper ends of the first-stage surfaces. Each pair of fuse positioning parts 813*a* for a fuse connection terminal 806*a* and a fuse connection part 810*a* (three-face opening parts formed along the inner surface of the peripheral wall 813*b*) are formed to face each other. This structure serves as a guide part allowing each fuse wire 817 to enter the connecting positions with ease even when there is a slight displacement in the setting of the fuse wire 817, facilitating the positioning of the fuse wire 817 at the connecting positions. FIG. 11 shows a state in which the fuse wires 817 have been connected to the fuse box secondary formation part 130*b*.

The peripheral wall 813*b* is a wall formed to surround the fuse connection terminals 806*a*, the fuse connection parts 810*a*, the fuse storage rooms 811, the partition walls 812 and the fuse positioning parts 813*a* related to the fuse wires 817. The height of the end (top) of the peripheral wall 813*b* is set sufficiently higher than the above parts. Thanks to the peripheral wall 813*b*, silicone gel (not shown) before hardening (curing), to be injected into the fuse box 813 and hardened for the protection against dust, can be collected in the fuse box 813 up to a height enough for covering the parts inside the fuse box 813 after the connection of the fuse wires 817 as will be explained later. Further, when a cap 813*c* is attached to the fuse box 813 after the hardening of the silicone gel, the whole circumference of the outer side face of the peripheral wall 813*b* and the whole circumference of the inner side face of the cap 813*c* are closely fit and engaged with each other in the state of spigot fitting (the fitting of the cap and the body of an inro (pillbox used in Japan)), by which the entry of dust, etc. into the fuse box 813 through the interface between the peripheral wall 813*b* and the cap 813*c* can be prevented.

Next, the details of the fuse box 813 and the side plate connector 815 will be explained below referring to FIGS. 11-14. Incidentally, the cap 813*c* and the silicone gel are not shown in FIG. 11 for easy understanding of the contents of the fuse box 813.

The fuse box secondary formation part 130b is configured as explained above. Specifically, the parts necessary for the connection of the fuse wires 817 are formed in the exposed state, the fuse wires 817 can easily be set to the connection parts of the fuse connection terminals 806a and the fuse connection parts 810a, the silicone gel to be injected and hardened for the protection against dust after the connection of the fuse wires 817 can be collected in the fuse box 813, and the entry of foreign matter can be prevented by attaching the cap 813c.

The state of connection of the fuse wire 817 will be explained here. The fuse wire 817 is positioned by the fuse positioning parts 813a (positioning the end parts 817a of the fuse wire 817, respectively) and then connected to the fuse connection terminal 806a and the fuse connection part 810a. Between the fuse connection terminal 806a and the fuse connection part 810a, the fuse storage room 811 capable of accommodating the curved part 817b of the fuse wire 817 has been formed.

The fuse storage room 811 is a bag-shaped cavity having a rectangular opening whose long sides are parallel to a line connecting the fuse connection terminal 806a and the fuse connection part 810a. The length of the long sides of the rectangular opening has been set properly so that the curved part 817b can be inserted in the fuse storage room 811 even when the position of the curved part 817b in the fuse wire 817 has slightly deviated in the axial direction. While the curved part 817b illustrated in this embodiment has only one concave part when viewed from the side (curved shape), insertion of even a curved part 817b having a complex shape (e.g., wavy shape) becomes possible by properly setting the length of the opening. The short sides of the rectangular opening of the fuse storage room 811 have been set properly so that the curved part 817b can be inserted in the fuse storage room 811 even when the curved part 817b has a slight displacement or a lean angle due to rotation. Further, the length of the short sides of the opening of the fuse storage room 811 has been set properly so that the curved part 817b of the fuse wire 817 set at the position before connection (i.e., the curved part 817b which has entered the fuse storage room 811) hits an inner side wall of the fuse storage room 811 and is thereby prevented from coming out from the fuse storage room 811 when the curved part 817b rotates around the axis of the fuse wire 817 due to something making contact with the fuse wire 817 during the connecting work.

The fuse box 813 is provided with the partition walls 812 which separate the fuse wires 817 from one another. Each partition wall 812 is formed at a constant height throughout the range from the position between two adjoining fuse positioning parts 813a on the fuse connection terminals' side to the opposing position between two adjoining fuse positioning parts 813a on the side plate connector terminals' side.

The other end 800a of each fuse connection terminal 806a (i.e., the tip end part 800a of each detection line 806 opposite to the fuse connection terminal 806a) is connected to each individual lithium-ion battery cell 140 via the conductive member 150 and thus is causing a potential difference. Therefore, the fuse wires 817 and the fuse connection parts 810a (connected to the fuse connection terminals 806a via the fuse wires 817) also have similar potential differences. The partition walls 812 are capable of preventing the occurrence of a short circuit between a fuse wire 817 and a fuse connection terminal 806a or a fuse connection part 810a connected by the fuse wire 817 when a foreign object made of metal entered the fuse box 813, for example.

The height of the partition walls 812 from the connection terminals is desired to be as greater as possible than the diameter of the fuse wire 817. The partition walls 812 can be made as high as the end (top) of the peripheral wall 813b if there is no restriction by the method of the connection of the fuse wires 817. For example, when the fuse wires 817 are connected by soldering, the height of the partition walls 812 is desired to be not only greater than the diameter of the fuse wire 817 but also sufficiently greater than the height of the solder bumps on the fuse connection terminals 806a and the fuse connection parts 810a. Making the partition walls 812 high allows to secure sufficient creepage distances between a combination (of a fuse wire 817 and the fuse connection terminal 806a and the fuse connection part 810a connected together by the fuse wire 817) and other combinations, by which the reliability of the prevention of the short circuit in cases of entry of an metallic foreign object can be increased.

Figure 12:
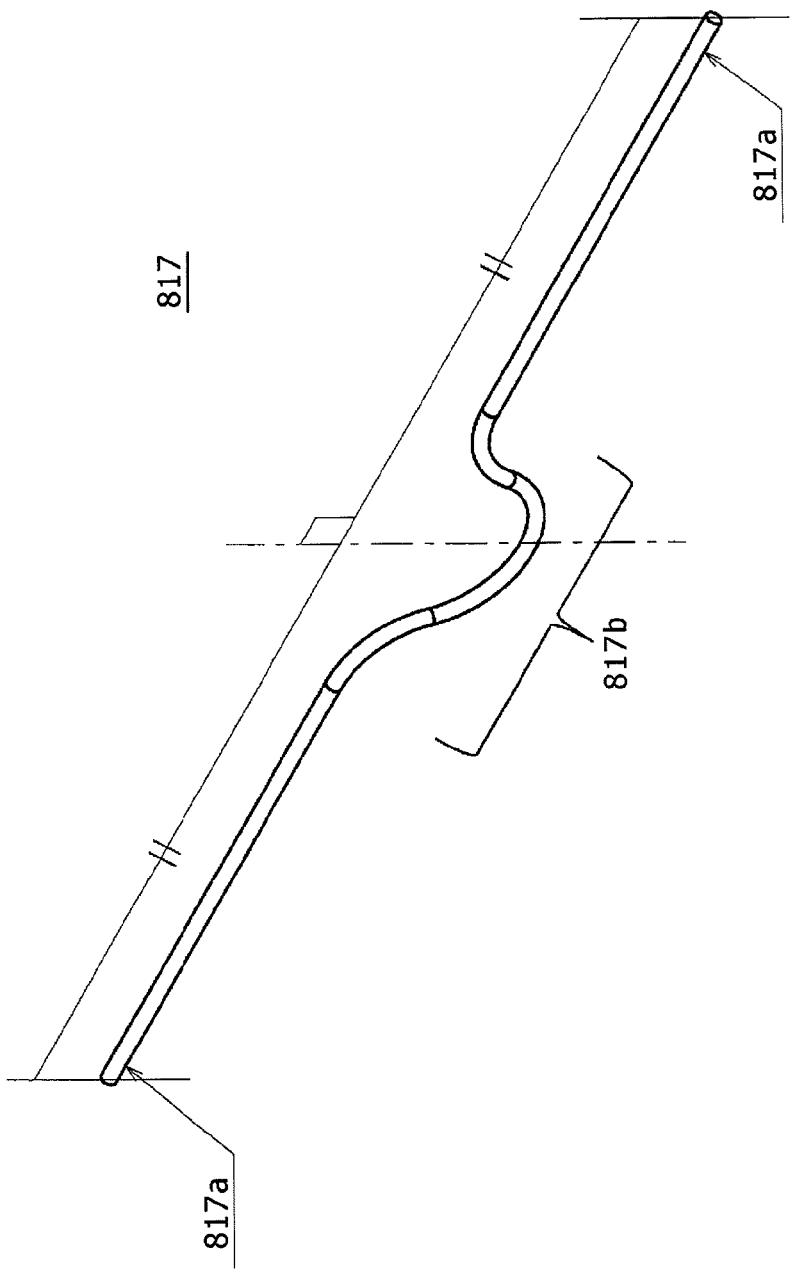
FIG. 12 is a perspective view of a fuse wire.
Figure 13:
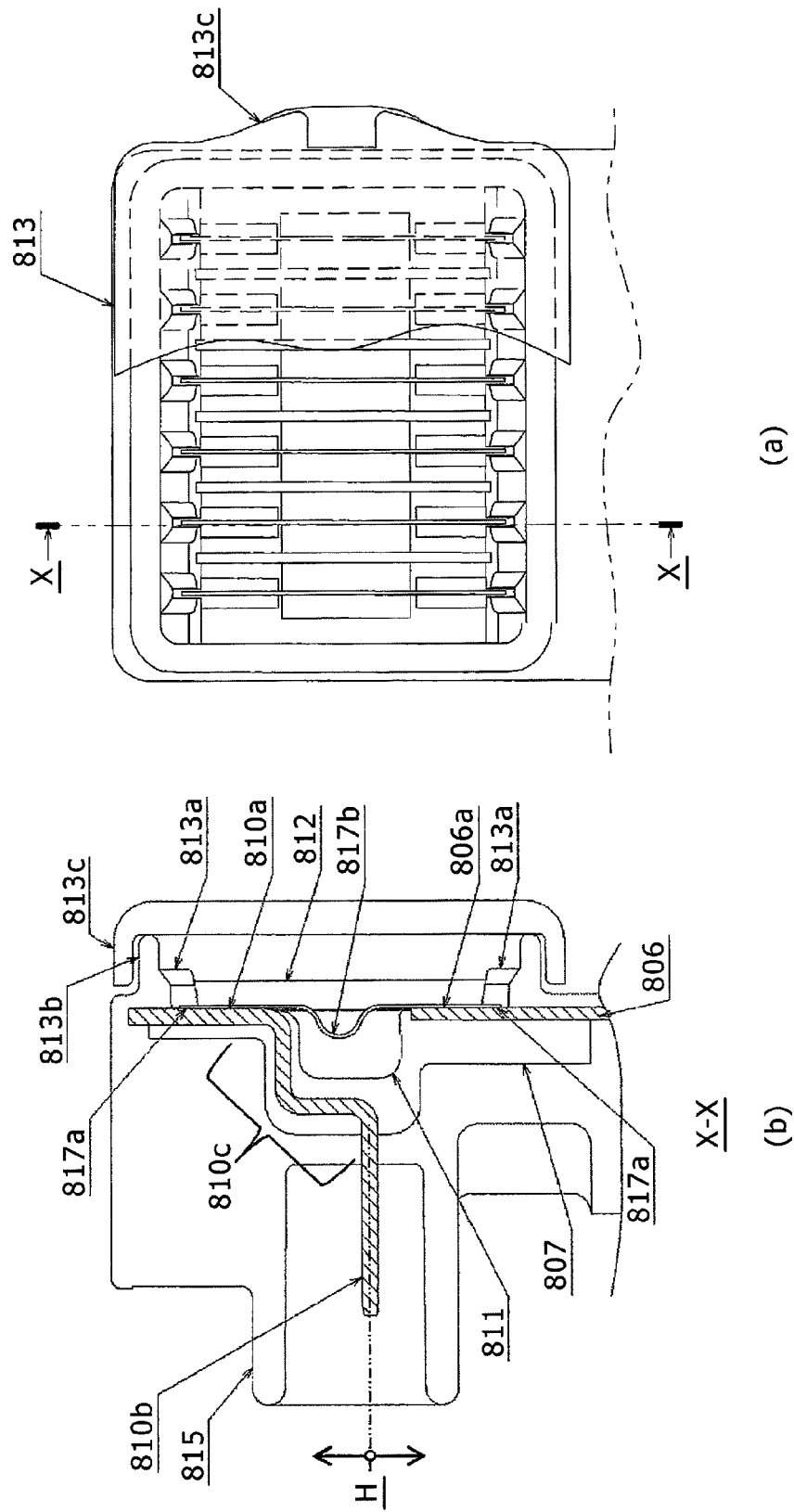
FIG. 13(*a*) is a front view of the fuse box.

FIG. 12 is a perspective view of the fuse wire 817. The fuse wires 817 are made by cutting a thin and cylindrical metal wire into pieces of a certain length and forming the curved part 817b in the central part of each piece. The material, the surface treatment, the wire diameter and the length of the fuse wire 817 and the shapes of the curved part, etc. have been set based on required specifications of the fuse, such as which components should be protected against trouble (e.g., inter-component short circuit occurring in the part from the side plate connector terminal 810 (connected to the fuse wire 817) to the control device 900), how high the current value for the blowout of the fuse wire 817 should be set for the protection of the selected components in the use environment of the battery module, and which method should be used for the connection of the fuse wire 817 (details are omitted here). Incidentally, while a thin and cylindrical metal wire is used as the fuse wire 817 in this embodiment, the fuse wire 817 may also be made by press work of a thin metal plate. It is also possible to use a safety component such as an already-existing current fuse if its size does not inhibit the installation. Methods usable for the connection include resistance welding, ultrasonic metal joining, soldering, etc.

The general shape of the fuse wire 817 in this embodiment is implemented by forming a slack shape like the curved part 817b in the central part of the fuse wire 817. The formation of the curved part 817b in the central part eliminates directivity of the fuse wire 817 and prevents problems like erroneous insertion of the fuse wire 817. Further, since the work of connecting the fuse wire 817 to the fuse connection terminal 806a and the fuse connection part 810a is performed while holding the side plate 130 with its exterior surface 170 facing upward and extending in parallel with the floor surface, the curved part 817b naturally enters and remains in the fuse storage room 811 due to its own weight (weight of the slack part) and gravity.

FIG. 13(a) is a front view of the fuse box 813. FIG. 13(b) is a cross-sectional view taken along the line X-X in the fuse wire connection part shown in FIG. 13(a). In FIG. 13(a), the left-hand part of the cap 813c is omitted and the silicone gel inside the fuse box 813 is not shown.

Arranged inside the fuse box 813 are the detection lines 806 and the side plate connector terminals 810 which have been integrated into one body by the resin part 807 of the fuse box primary formation part 805a. Each detection line 806 is electrically connected to the corresponding side plate connector terminal 810 by the connection of the fuse wire 817 to the fuse connection terminal 806a and the fuse connection part 810a. Each fuse wire 817 has been connected in the appropriate state in which its end parts 817a have been positioned by the fuse positioning parts 813a and its curved part 817a has been stored in the fuse storage room 811. The peripheral wall 813b has been formed to surround the periphery of the fuse wire connection part. The fuse box 813 has been formed by the engagement of the whole circumference of the outer side face of the peripheral wall 813b with the whole circumference of the inner side face of the cap 813c.

The side plate connector terminal 810 extends from the fuse box 813's side (right-hand side in FIG. 13(b)) to the inside of the housing of the side plate connector 815 on the back side (left-hand side in FIG. 13(b)). In this embodiment, each side plate connector terminal 810 is configured to avoid other structures like the fuse storage room 811, by forming three bent parts in the bending part 810c of the side plate connector terminal 810. The position H of the side plate connector terminal end part 810b (i.e., the terminal end part 810b of the side plate connector terminal 810) can be set freely by adjusting the number of times of bending of the bending part 810c and the length necessary for the bending part. Since the position of the side plate connector 815 (as well as the positions of the side plate connector terminal end parts 810b) affects the height of the battery module 100 in this embodiment, the height of the side plate connector 815 is set properly by adjusting the bending parts 810c of the side plate connector terminals 810.

The details of the side plate connector 815 will be explained here referring to FIG. 14. FIG. 14 is a perspective view of the side plate connector 815. As mentioned above, the side plate connector 815 is provided on the back of the fuse box 813 and on the same side of the side plate 130 as the lithium-ion battery cell 140 (opposite to the exterior surface 170). In this embodiment, the side plate connector 815 is placed at the top of the battery module 100 and close to the cooling medium inlet 114. The housing of the side plate connector 815 is facing inward (toward the center of the battery module 100), by which the wiring 800 connected to the side plate connector 815 is prevented from sticking out from the battery module 100 (see FIGS. 2, 3 and 4).

Six terminal end parts 810b of the side plate connector terminals 810 are protruding to the inside of the housing of the side plate connector 815 in this embodiment. A side face of the housing has a key gap 815b. The top of the housing is provided with a lock part 815a. The lock part 815a is designed in conformity with the specifications of the connectors to be connected to the side plate connector 815 (i.e., the connectors of the connection wires 800).

In this embodiment, the method of connecting the fuse wires 817 to the fuse box secondary formation part 130b is designed in consideration of the use of an automated machine. A procedure for the connection of the fuse wires 817 in accordance with this embodiment will be explained below (explanation of inspection steps is omitted).

(1) The side plate 130 is set on a conveyance table (not shown) which is used for feeding the side plate 130 to the automated machine. The side plate 130 is set on the conveyance table with its exterior surface 170 facing upward and extending in parallel with the floor surface. In other words, the fuse box 813 is set to expose the connection surfaces of the fuse connection terminals 806a and the fuse connection parts 810a upward.

(2) The fuse wire 817 before being processed (wire wound around a bobbin) is set on equipment. The end of the wire is set on formation equipment, the cutting and the formation of the fuse wires 817 is carried out by the formation equipment, and the fuse wires 817 are set on the fuse box secondary formation part 130b of the side plate 130 conveyed to the equipment. Each fuse wire 817 is positioned by the fuse positioning parts 813a (positioning the end parts 817a) with its curved part 817b stored in the fuse storage room 811.

(3) Each fuse wire 817 is connected to the fuse connection terminal 806a and the fuse connection part 810a. Resistance welding, ultrasonic metal joining, soldering, etc. can be used for the connection.

(4) Silicone gel is injected into the fuse box 813 and hardened. Thereafter, the cap 813c is attached to the fuse box 813, by which the connection of the fuse wires 817 is completed.

The fuse box 813 is equipped with the fuse wires 817 as mentioned above and electrically connects the wiring (connection wires) 800 extending from a voltage detection connector 912 of the control device 900 to the detection lines 806 of the voltage detection conductor 805 via the fuse wires 817. The control device 900 has two voltage detection connectors 912, each on each end in the short-side direction. The connection wires 800 connected to the side plate connector of the high potential-side battery block 100a are connected to one voltage detection connector 912 of the control device 900 arranged over the high potential-side battery block 100a. On the other hand, the connection wires 800 connected to the side plate connector of the low potential-side battery block 100b are connected to the other voltage detection connector 912 of the control device 900 arranged over the low potential-side battery block 100b. The length of each connection wire 800 has been set corresponding to the distance from each connection terminal 810 to the corresponding connector 912 in order to prevent wiring errors. For example, the length of the connection wire 800 connected to a connection terminal 810 of the high potential-side battery block 100a has been set at a short length insufficient for reaching the voltage detection connector 912 for the low potential-side battery block 100b. The fuse wires 817 installed in the fuse box 813 have the function of protecting the product by blowing out and interrupting the electric current from the assembled battery 120 in case of abnormality of the control device 900 or the wiring 800.

Figure 15:
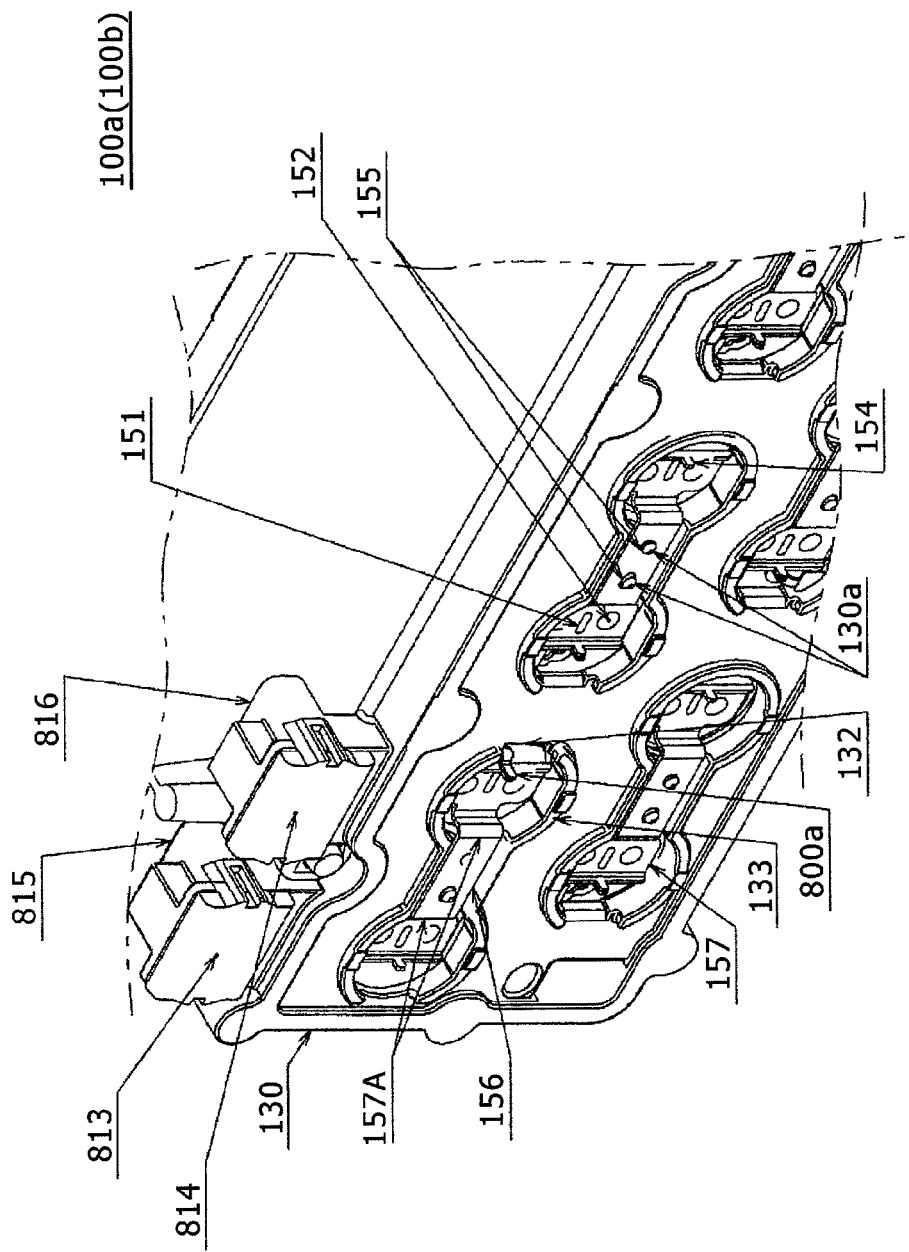
FIG. 15 is a partial perspective view of the battery block, showing a state in which conductive members have been attached to the side plate.

FIG. 15 is a partial perspective view of the high potential-side battery block 100a, showing a state in which the conductive members 150 have been attached to the side plate 130 and connected to the lithium-ion battery cells 140. The conductive members 150 are plate-like members made of metal (e.g., copper) for electrically connecting the lithium-ion battery cells 140 together. The conductive members 150 are formed separately from the side plate 130. However, a conductive member 150a formed integrally with the connection terminal 180 and a conductive member 150b formed integrally with the connection terminal 181 are formed integrally with the side plate 130 as shown in FIG. 5.

The conductive member 150 is made up of the central part 156 extending like a belt and end parts 157 on both sides of the central part 156. The central part 156 is connected to each end part 157 via a bending part 157A. In short, the conductive member 150 is formed in a step-like shape by bending. Each end part 157 of the conductive member 150 has a through hole 151, two joining parts 152 to be joined to the terminal face of the lithium-ion battery cell 140, and a welding part 154 to be connected to the tip end part 800a of the voltage detection conductor 805. The through hole 151 is formed to let through gas in the aforementioned case where the gas spouts out from the lithium-ion battery cell 140. The central part 156 of the conductive member 150 has two through holes 155, into which the fixation guides 130a of the side plate 130 are inserted. While the through hole 151 is formed in an elliptical shape in this embodiment, the through hole 151 may also be formed in a circular shape.

Each conductive member 150 is attached to the side plate 130, with the two through holes 155 of the central part 156 engaging with two fixation guides 130a of the side plate 130.

By the attachment of the conductive member 150 to the side plate 130, each end part 157 of the conductive member 150 enters the through hole 132 and contacts the terminal face of the corresponding lithium-ion battery cell 140. At the same time, each welding part 154 of the conductive member 150 makes contact with the tip end part 800a of the voltage detection conductor 805 exposed to the through hole 132 of the side plate 130. Incidentally, some of the through holes 132 have no tip end part 800a exposed thereto as shown in FIG. 7 due to the connective structure of the lithium-ion battery cells 140.

Figure 16:
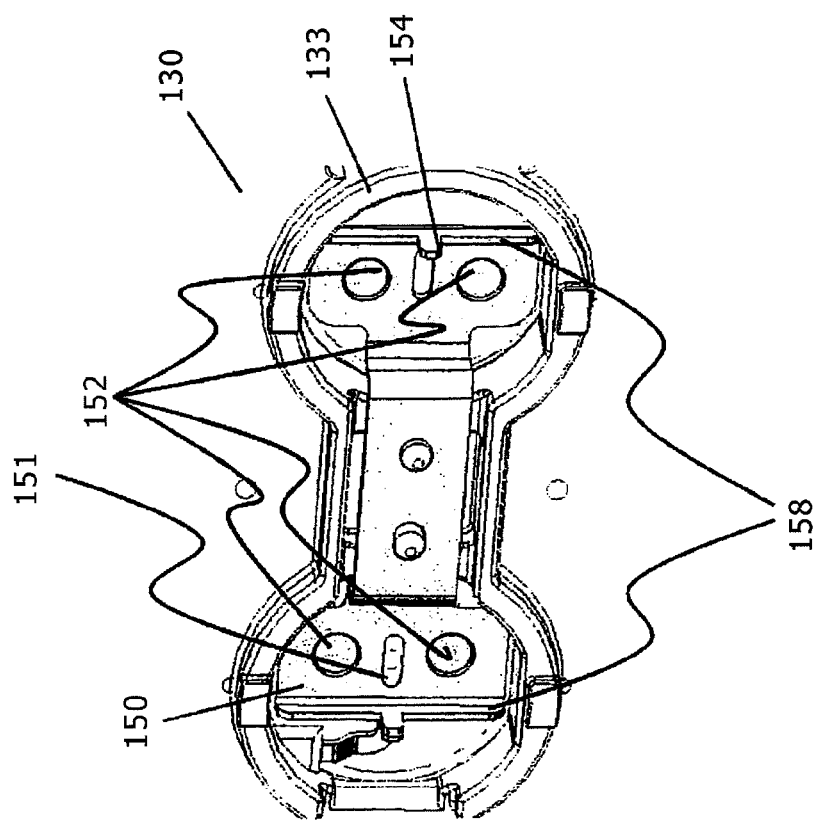
FIG. 16 is a perspective view showing the details of the conductive member.

FIG. 16 is a perspective view showing the details of the conductive member 150 which has been attached to the side plate 130. FIG. 17(a) shows the configuration of the connection part between the conductive member 150 and the lithium-ion battery cell 140. FIG. 17(b) is a cross-sectional view taken along the line A-A in FIG. 17(a). FIG. 17(c) is a cross-sectional view taken along the line B-B in FIG. 17(a).

Each conductive member 150 is joined to two lithium-ion battery cells 140 via the joining parts 152 of the end parts 157 by fusion joining. Specifically, a welding torch is positioned at the joining part 152 and the joining part 152 is joined to the lithium-ion battery cell 140 by arc welding. The arc welding can include TIG welding, gas shielded arc welding, etc. Extremely high heat is caused in the arc welding since the arc welding is a joining technique of joining a base material and a filler material together by fusing them with high heat. Therefore, in severe welding conditions, angular portions, etc. of the through hole 151 or the end part 157 in the vicinity of the joining part 152 can be melted by the welding heat. The melting of the angular portions of the end part 157 reduces the fusing area of the end part 157 to be joined to the lithium-ion battery cell 140, disabling the satisfactory joining between the conductive member 150 and the lithium-ion battery cell 140. Further, since the through hole 151 has to function as a gas discharge hole when gas spouts out from the lithium-ion battery cell 140 as mentioned above, closure of the opening of the through hole 151 caused by the melting of the end part 157 has to be prevented.

Thus, each of the end parts 157 of the conductive member 150 in this embodiment is provided with a rising part 158 as shown in FIG. 16. The rising part 158 has the function of radiating a sufficient amount of welding heat when each joining part 152 is fused and joined to the lithium-ion battery cell 140. Further, the through hole 151 is designed to be as far as possible from the joining parts 152 in order to reduce the effect of the heat caused by the welding. Specifically, the through hole 151 is formed in an elliptical shape and the elliptical through hole 151 is positioned at a midpoint between the two joining parts 152 of each end part 157. The efficient heat radiation and the prevention of the melting of the through hole 151 during the welding (implemented by providing each end part 157 of the conductive member 150 with the rising part 158 and forming the through hole 151 in an elliptical shape as above) make it possible to set sufficiently wide permissible ranges of the welding conditions with safety margins in consideration of quality variations of parts, etc.

Each conductive member 150 in this embodiment is provided with four joining parts 152 as explained above. This means that two joining parts 152 are provided for each lithium-ion battery cell 140. The number of joining points between conductive members 150 and lithium-ion battery cells 140 varies depending on the specifications of the battery module, etc. Each joining part 152 is formed as a circular convex part protruding toward the lithium-ion battery cell 140. The circular joining part 152 serves as the starting point of the welding with the lithium-ion battery cell 140. The diameter of the joining part 152 has been set considering variations in the torch position of the welding equipment and variations due to the combination of the components of the lithium-ion battery device 1000.

Next, the control device 900 constituting the lithium-ion battery device 1000 will be explained below. As shown in FIGS. 2 and 3, the control device 900 is mounted on the battery module 100. Specifically, the control device 900 is an electronic circuit device mounted on the high potential-side battery block 100a and the low potential-side battery block 100b to straddle the two battery blocks 100a and 100b. The control device 900 has the enclosure 910 and a circuit board stored in the enclosure 910.

The enclosure 910 is a metallic box in a shape like a flat rectangular prism. The enclosure 910 is fixed to the high potential-side battery block 100a and the low potential-side battery block 100b by use of fixation means such as bolts or screws. By the fixation, ends of the high potential-side battery block 100a and the low potential-side battery block 100b in the short-side direction are connected and fixed to each other via the control device 900. The control device 900, serving also as a supporting member, is capable of enhancing the strength of the battery module 100.

Side faces of the enclosure 910, that is, end faces of the control device 900 in the short-side direction are equipped with a plurality of connectors. The connectors include the voltage detection connectors 912, temperature detection connectors 913 and external connection connectors 911. Connected to the voltage detection connectors 912 are the connectors of the connection wires 800 electrically connected to the thirty-two lithium-ion battery cells 140. Connected to the temperature detection connectors 913 are connectors of signal lines of a plurality of temperature sensors (not shown) arranged inside the battery module 100.

Connected to the external connection connectors 911 are connectors (not shown) of a power supply line for supplying electric power to the battery controller 300, a signal line for inputting the ON/OFF signals from the ignition key switch, communication lines for CAN communication with the vehicle controller 30 and the motor controller 23, etc.

Figure 18:
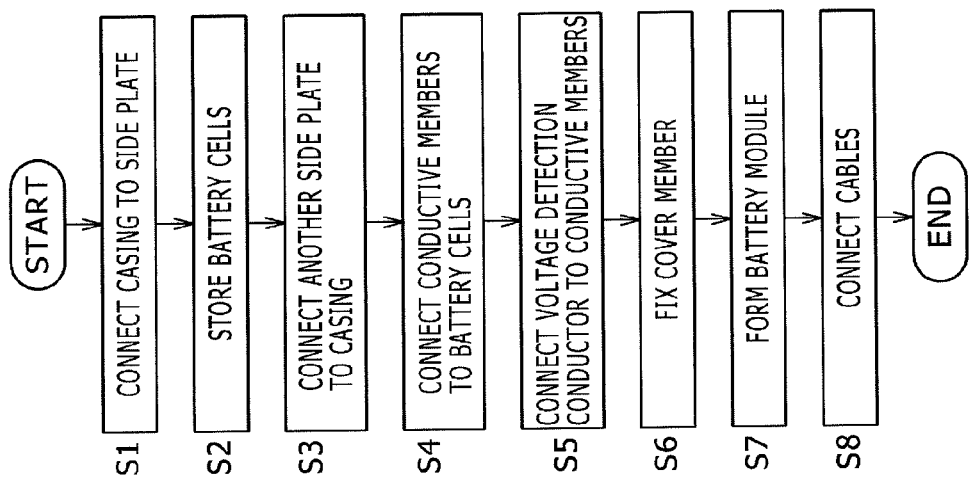
FIG. 18 is a flow chart for explaining a procedure for manufacturing the lithium-ion battery device.

A manufacturing method (especially an assembling method) of the lithium-ion battery device 1000, comprising the battery module 100 and the control device 900 which have been described above, will be explained below referring to a flow chart of FIG. 18.

First, the assembly of the high potential-side battery block 100a and the low potential-side battery block 100b is started in step S1. The inlet channel formation plate 111, the outlet-side guide plate 113, the cooling medium inlet 114 and the cooling medium inlet duct 116 are assembled into one body. Further, the outlet channel formation plate 118, the inlet-side guide plate 112, the cooling medium outlet 115 and the cooling medium outlet duct 117 are assembled into one body. Then, these assemblies are fixed to one of the side plates 130 and 131 (e.g., the side plate 130) via sealing members (not shown) by use of fixation means such as bolts, screws or rivets. The part assembled so far (assembly) is set on a table while placing the side plate 130 at the bottom.

In step S2, each lithium-ion battery cell 140 is attached to the side plate 130 by using an adhesive agent (adhesive member). The adhesive agent, having appropriate elasticity, has the function of bonding each lithium-ion battery cell 140 and the side plate 130 together while sealing up the interface between each lithium-ion battery cell 140 and the side plate 130. By using such an adhesive agent having elasticity, hermeticity (gas sealing, liquid sealing) between the cooling channel inside the casing 110 (including the side plate 130)

and the gas discharge room outside the casing 110 can be secured, while maintaining the connection between the side plate 130 and the lithium-ion battery cells 140 by absorbing vibrations even when vibrations are given to the battery module 100, for example. The adhesive member may also be implemented by use of a liquid gasket having the above function.

In step S3, the side plate 131 is attached to the assembly obtained by the step S2 by using an adhesive agent (adhesive members) similarly to the step S2. Then, the assembly is fixed to the side plate 131 by use of fixation means such as bolts, screws or rivets similarly to the step S1. By this step, the assembled battery 120 is stored in the casing 110.

In step S4, the lithium-ion battery cells 140 and the conductive members 150 are connected together. First, as shown in FIG. 15, the conductive members 150 are attached to one of the side plates 130 and 131 (e.g., the side plate 130) by engaging the through holes 155 of the conductive members 150 with the fixation guides 130*a* of the side plate 130. Then, the joining parts 152 of the conductive members 150 are joined to the terminal faces of corresponding lithium-ion battery cells 140 by arc welding (e.g., TIG welding). Similarly, the other conductive members 150 are attached to the other one of the side plates 130 and 131 (e.g., the side plate 131), and the joining parts 152 of the conductive members 150 are joined to the lithium-ion battery cells 140 by arc welding.

In the next step S5, the detection lines 806 are connected to the conductive members 150. Specifically, the tip end part 800*a* of each detection line 806 is placed in contact with a corresponding welding part 154 of a corresponding conductive member 150 and joined to the welding part 154 by arc welding.

In step S6, the cover member 160 is attached to each side plate 130, 131 via a sealing member 135 and then fixed to the side plate 130, 131 by use of fixation means 161 such as bolts, screws or rivets. The sealing member 135, as an annular sealing member having elasticity (e.g., O-ring made of rubber), has been fitted into a groove 134 of the side plate 130, 131. The sealing member 135 may also be implemented by use of a liquid gasket.

In the next step S7, the two assemblies obtained by the step S6 (the battery blocks 100*a* and 100*b*) are placed side by sided so that their longitudinal directions coincide with each other. In this state where the two battery blocks 100*a* and 100*b* have been placed in parallel, the module base 101 is attached to the battery blocks 100*a* and 100*b*. The module base 101 is fixed to the bases of the casings 110 of the battery blocks 100*a* and 100*b* by use of fixation means such as bolts, screws or rivets. The enclosure of the control device 900 is fixed on the central parts of the two battery blocks 100*a* and 100*b* in regard to the longitudinal direction by use of fixation means such as bolts, screws or rivets, by which the battery module 100 is formed.

Incidentally, the order of assembling (attaching) the components of the battery module 100 is not restricted to the above order; the order of attaching/fixing the components may be changed properly.

In the next step S8, the connectors of the connection wires 800 (voltage detection lead wire connector parts) are connected to the side plate connectors 815 and 816 (voltage detection conductor connector parts) of the battery module 100 and to the connectors 912 of the control device 900. The connectors of the signal lines extending from the temperature sensors (not shown) arranged in the battery blocks 100*a* and 100*b* of the battery module 100 are connected to the connectors 913 of the control device 900. Further, the connectors of the communication lines for the communication with the upper-level control devices (e.g., the vehicle controller 30 and the motor controller 23) are connected to the connectors 911 of the control device 900.

By the assembling work according to the above steps S1-S8, the lithium-ion battery device 1000 is completed.

Figure 17:
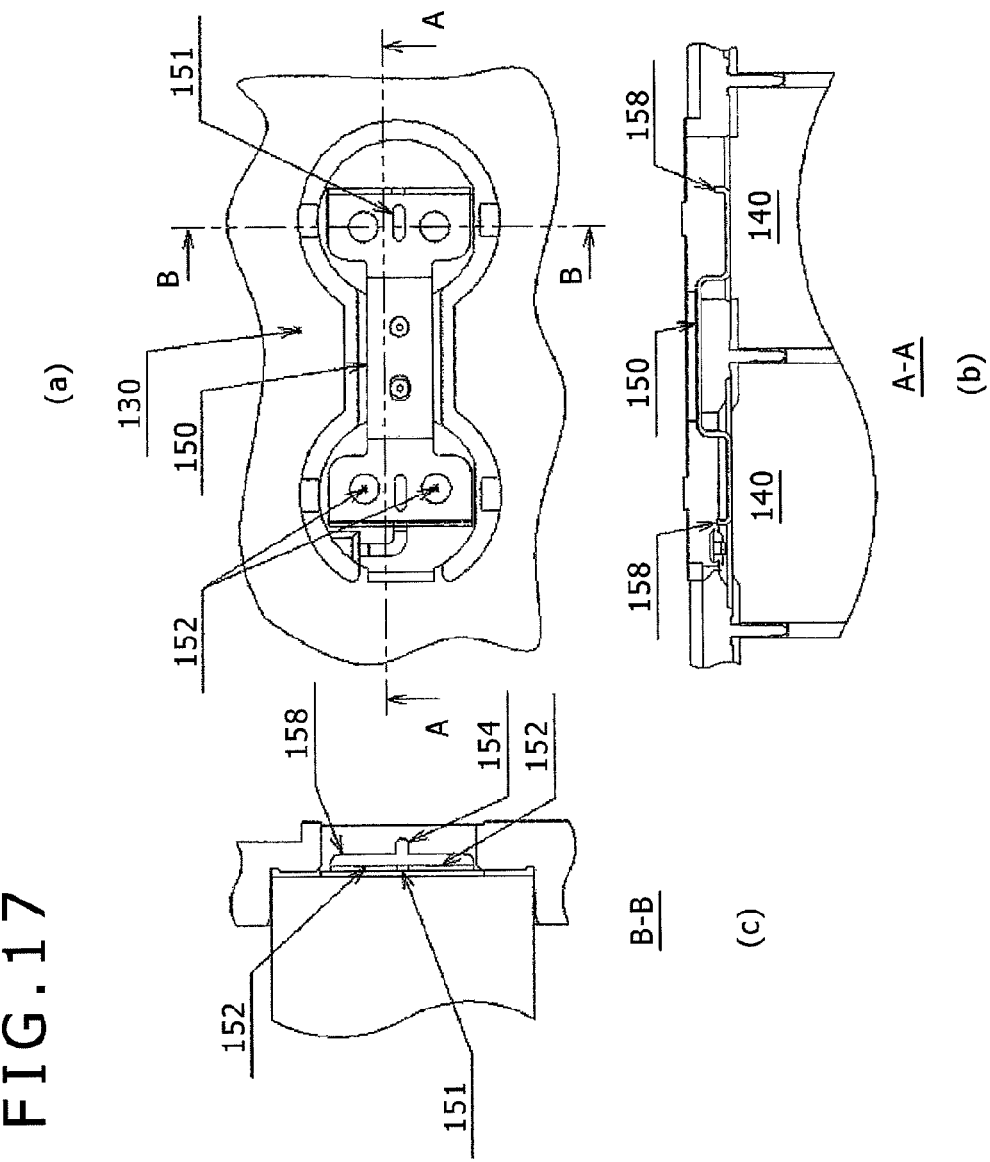
FIG. 17(*a*) is a schematic diagram showing the configuration of a connection part between the conductive member and a lithium-ion battery cell.

By the electricity storage module (battery module 100) and the electricity storage device (lithium-ion battery device 1000) according to the embodiment described above, the following effects can be achieved:

(1) The battery module 100 comprises a plurality of electricity storage cells (capacitors) 140, a casing 110 storing the electricity storage cells (lithium-ion battery cells) 140, a pair of side plates 130 and 131 made of resin sandwiching and supporting at least a plurality of electricity storage cells 140 from both sides, and a plurality of conductive members 150 for electrically connecting the electricity storage cells 140 together. The conductive members 150 are attached to the side plates 130 and 131 from the outside of the casing 110 in order to connect the electricity storage cells 140 together. With this configuration, the connection of the conductive members 150 and the electricity storage cells 140 can be carried out with ease. In the embodiment described above, the conductive members 150 and the lithium-ion battery cells 140 are fused and joined together by arc welding, etc. The electricity storage module (battery module) 100 has a metallic cover member 160. The metallic cover member 160 is provided for the casing 110 to cover the pair of side plates 130 and 131 from outside. Each side plate 130, 131 is provided with peripheral wall parts 133 each protruding from the side plate 130, 131 to surround each conductive member 150. The peripheral wall parts 133 are configured to prevent a short circuit caused by contact between a conductive member 150 and the cover member 160 made of steel, for example. Each peripheral wall part 133 is arranged as shown in FIGS. 15-17 to substantially surround the whole periphery of the conductive member 150 except for the vicinity of the position where the tip end part 800*a* of the voltage detection conductor 805 is arranged. Thus, the peripheral wall parts 133 are capable of withstanding a variety of external force in cases where the cover member 160 is deformed toward the inside of the casing 110 by external force, for example. Further, in order to prevent the contact between the cover member 160 and the conductive members 150, each side plate 130, 131 is further provided with fixation guides 130*a* protruding from the surface of the side plate 130, 131 as shown in FIG. 15. The height of the peripheral wall parts 133 from the side plate 130, 131 is desired to be equal to or greater than the height of the fixation guides 130*a* from the side plate 130, 131. With this configuration, the short circuit between the cover member 160 and the conductive members 150 can be prevented with high reliability.

(2) In the battery module 100, the electricity storage cells (capacitors) 140 and the conductive members 150 are joined together by fusion joining. Each conductive member 150 is provided with wall parts (rising parts) 158 for radiating the heat of the fusion joining. If the conductive member 150 is melted by the heat generated in the fusion joining, satisfactory fusion joining with the capacitor 140 can be disabled. By providing the conductive member 150 with the wall parts 158 and efficiently radiating the heat of the fusion joining, the welding can be carried out excellently and side plates 130 and 131 with high reliability can be provided.

(3) Each end part (end region) 157 of the conductive member 150 is joined to an end face of an electricity storage cell 140 by fusion joining. Each end part 157 is provided with a through hole 151 for letting through gas spouting out from the electricity storage cell 140 in case of abnormality. The through hole 151 is formed in an elliptical shape so as to function as the opening for discharging the gas while also reducing the ill effect of high heat during the welding.

(4) The height of the wall parts 158 of the conductive members 150 has been set so that the wall parts 158 become lower than the height of the cover member 160 attached to the side plate 130, 131 when the conductive members 150 and the electricity storage cells 140 have been joined together by fusion joining. With this configuration, undesirable contact between the metallic cover member 160 and the wall parts 158 can be prevented while securing the heat radiation function.

(5) The battery module 100 further comprises a voltage detection conductor 805 for detecting the voltage of each electricity storage cell 140. The voltage detection conductor 805 is formed to have a plurality of detection lines 806 corresponding to the positions of the conductive members 150. The distance d between adjacent detection lines 806 has been set at 2-2.5 times the insulation creepage distance specified by the voltage of the battery module 100. With this configuration, the short circuit between the detection lines 806 can be prevented reliably even when the pollution level of the use environment of the battery module 100 is high.

(6) The tip end parts 800a of the detection lines 806 are connected to the conductive members 150, and the other ends of the detection lines 806 are provided with a fuse box 813 for interrupting the electric current from the electricity storage cells 140. The fuse box 813 protects the product by having a fuse wire 817 blow out and interrupt the electric current from the assembled battery 120 in case of abnormality of the control device 900 or the wiring 800. With the fuse box 813 provided at the other ends of the detection lines 806, a fuse wire 817 blows out and interrupts the electric current at the other end of a detection line 806 in case of a short circuit occurring to the wiring 800, for example, by which the whole battery module 100 can be protected. In this case, the battery module 100 can be reused by replacing the fuse wire 817 and the wiring 800. Incidentally, substantially no short circuit occurs among the detection lines 806 themselves since the detection lines 806 have been formed in prescribed shapes and integrated with the side plate 130, 131.

(7) The detection lines 806 of the voltage detection conductor 805 have been integrated with the side plate 130, 131 by being insert-molded in the resin-made side plate 130, 131 while being maintained in prescribed shapes by a resin material (resin part) 807. Specifically, a subsidiary unit is formed by fixing the voltage detection conductor 805 in its original shape of formation by use of the resin part 807 and then the side plate 130, 131 is manufactured by the insert molding of the subsidiary unit. The formation of the subsidiary unit makes it possible to securely maintain the shape of the voltage detection conductor 805 and to prevent erroneous contact between the detection lines 806 of the voltage detection conductor 805 in the manufacturing process.

(8) Each side plate 130, 131 has through holes 132 formed at positions corresponding to the electricity storage cells 140. The electricity storage cells 140 are attached to the side plates 130 and 131 by using adhesive members so as to hermetically shut and cover the through holes 132. With this configuration, the interfaces between the inside and the outside of the casing 110 can be sealed up. Further, the connection between each side plate 130, 131 and the electricity storage cells 140 can be maintained while having the adhesive members absorb external force (e.g., vibrations) applied to the battery module 100.

(9) The electricity storage device (lithium-ion battery device) 1000 comprises the battery module 100 and a control device 900. The control device 900 is connected to the detection lines 806, detects the voltages of the electricity storage cells 140, and controls the electric amounts (amounts of stored electricity) of the electricity storage cells 140. Since the battery module 100 can be manufactured without the need of performing complicated work of wiring voltage detection lead wires as explained above, the whole electricity storage device 1000 can be manufactured with high efficiency.

While the voltage detection conductor 805 formed in a prescribed shape is integrated with the side plate 130, 131 by means of insert molding in the above embodiment, the method of integrating the voltage detection conductor 805 with the side plate 130, 131 is not restricted to the insert molding. For example, the integration can also be achieved by forming the side plate 130, 131 with two members and fitting the voltage detection conductor 805 formed in a prescribed shape between the two members. However, this method of integration (fitting the voltage detection conductor 805 between the two members of the side plate 130, 131) tends to increase the thickness of the side plate 130, 131 compared to the formation of the side plate 130, 131 by insert molding. Thus, it is preferable, in terms of the thickness, to integrate the voltage detection conductor 805 with the side plate 130, 131 by means of insert molding. The voltage detection conductor 805 may also be mounted on the side plate 130, 131 instead of arranging it inside the side plate 130, 131. Also in this case, the tip end parts 800a of the voltage detection conductor 805 are connected to the welding parts 154 of the conductive members 150.

While the battery module 100, comprising two battery blocks 100a and 100b each including sixteen lithium-ion battery cells 140 connected together, has been illustrated in the above embodiment, the present invention is not to be restricted to the above-described configuration or connection style (series, parallel) of the battery module 100. The present invention is applicable also to other types of battery modules 100 in which the number of lithium-ion battery cells 140 or the number, arrangement or direction of the battery cell lines is different.

While cylindrical batteries have been illustrated as an example of the lithium-ion battery cells 140 in the above embodiment, the present invention is not restricted to cylindrical batteries. For example, the present invention is applicable also to lithium-ion battery cells 140 formed as rectangular storage batteries, laminate-sealed batteries, etc. Further, the present invention is applicable not only to lithium-ion batteries but also to other types of batteries such as nickel-hydrogen batteries.

The electricity storage device 1000 in accordance with the above embodiment can also be used as a power supply device for different types of electric vehicles/cars, such as railroad cars (e.g., hybrid trains), buses, trucks and industrial vehicles (e.g., battery-driven fork lift trucks).

Furthermore, the electricity storage device 1000 in accordance with the embodiment may also be applied to an electricity storage device constituting a power supply device not for an electric vehicle/car, such as an uninterruptible power supply device (used for a computer system, a server system, etc.) and a power supply device used for household power generation equipment.

The above description has been given just as an example for illustration, and thus the present invention is not to be restricted to the particular illustrative configuration of the above embodiment.

The invention claimed is:
1. An electricity storage device comprising:
a plurality of electricity storage cells;

a casing having at least a pair of side plates and storing the electricity storage cells;
a control device which controls the electricity storage cells;
one or more voltage detection conductors integral to each of the side plates and having first end parts electrically connected to the electricity storage cells;
voltage detection lead wires electrically connecting the voltage detection conductor with the control device; and
one or more connection devices each including a current interruption unit which is configured to be capable of interrupting electric current from the electricity storage cells and a side plate-side connector to which a lead wire-side connector of the voltage detection lead wires is connected, the connection devices electrically connecting the one or more voltage detection conductors with the voltage detection lead wires via the current interruption unit, wherein:
the connection devices are formed integrally with each of the side plates so that the current interruption unit and the side plate-side connectors adjoin each other in a direction in which the pair of side plates face each other and a height of the side plate-side connector is less than a height of the current interruption unit in a height direction of the side plates orthogonal to the direction in which the side plates face each other, and
second end parts of the one or more voltage detection conductors and first connector end parts of side plate connector terminals of the side plate-side connector are arranged to face each other in the current interruption unit, and
the current interruption unit electrically connects the second end parts of the voltage detection conductors with the first connector end parts of the side plate connector terminals by use of fuse wires, and
each of the side plate-side connectors includes a connector housing which is formed at a position lower than the height of the current interruption unit in the height direction of the side plates and the side plate connector terminals which extend from the current interruption unit to the connector housing, and
each of the side plate connector terminals has the first connector end parts arranged in the current interruption unit, second connector end parts arranged in the connector housing and connected to the lead wire-side connector, and a bending part bending the side plate connector terminal between the first connector end parts and the second connector end parts.

2. The electricity storage device according to claim 1, wherein:
the fuse wires have a curved part formed between a first connection end connected to the second end parts of the one or more voltage detection conductors and a second connection end connected to the first connector end parts of the side plate connector terminals, and
the current interruption unit has a concave part which is formed between the position where the second end parts of the voltage detection conductor and the first connection end of the fuse wires are arranged and the position where the first connector end parts of the side plate connector terminals and the second connection end of the fuse wires are arranged, and
the curved part of the fuse wires is stored in the concave part in a state in which the first connection end and the second connection end of the fuse wires have been connected to the second end parts of the one or more voltage detection conductors and the first connector end parts of the side plate connector terminals, respectively.

3. The electricity storage device according to claim 1, wherein:
the voltage detection conductor is made up of a plurality of conductor elements corresponding to the electricity storage cells, and
a fuse connection part of each conductor element forms the second end parts of the voltage detection conductor, and
the side plate connector terminals are made up of a plurality of connector elements corresponding to the conductor elements, and
a fuse connection terminal of each connector element forms the first connector end part of the side plate connector terminals, and
each of the fuse wires connecting the fuse connection part with a fuse terminal part extends in the height direction of the side plates, and
a plurality of sets each including the fuse connection part, the fuse connection terminal and the fuse wires are arranged in parallel inside a peripheral wall which demarcates the periphery of the current interruption unit.

4. The electricity storage device according to claim 3, wherein positioning parts for positioning the fuse wires of the sets are arranged along a first inner surface of the peripheral wall on a side of the fuse connection part and along a second inner surface of the peripheral wall on a side of the fuse connection terminal.

5. The electricity storage device according to claim 3, wherein a partition wall is provided between adjacent ones of the sets.

6. The electricity storage device according to claim 1, wherein the one or more connection devices further include:
a first formation part in which the second end parts of the voltage detection conductor and the first connector end parts of the side plate connector terminals are integrated together by a resin part; and
a second formation part in which a peripheral wall demarcating the periphery of the current interruption unit is formed while exposing the second end parts of the voltage detection conductor and the first end parts of the side plate connector terminals.

7. The electricity storage device according to claim 1, wherein a top of the connector housing in regard to the height direction is provided with a lock part for the lead wire-side connector.

8. The electricity storage device according to claim 1, wherein the current interruption unit is injected with silicone gel.

9. The electricity storage device according to claim 1, wherein:
the one or more connection devices have a cap which covers an exposed part of the current interruption unit, and
the cap and the current interruption unit are connected together by spigot fitting structure.

10. The electricity storage device according to claim 2, wherein:
the first connector end part of the side plate connector terminals extend in the height direction of the side plates, and
the second connector end parts of the side plate connector terminals extend in the direction in which the side plates face each other, and
the bending part of the side plate connector terminals is formed so that the connector terminal extends from the current interruption unit to the connector housing while avoiding the concave part of the current interruption unit.

11. The electricity storage device according to claim 2, wherein:

the curved part is formed in a central part of the fuse wires, and the concave part has a rectangular opening whose long sides are parallel to an extending direction of the fuse wires, and a length of shorter sides of the rectangular opening is set so that the curved part makes contact with an inner wall of the concave part when the fuse wires rotate around its axis.

* * * * *